United States Patent
Yamamoto et al.

(10) Patent No.: US 10,484,118 B2
(45) Date of Patent: Nov. 19, 2019

(54) INTERCOM SYSTEM AND COMMUNICATION CONTROL METHOD

(71) Applicant: Panasonic Intellectual Property Management Co., Ltd., Osaka (JP)

(72) Inventors: Takashi Yamamoto, Fukuoka (JP); Katsumi Nakagawa, Fukui (JP); Naotaka Kusui, Fukuoka (JP); Toshio Hayashi, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/341,350

(22) Filed: Nov. 2, 2016

(65) Prior Publication Data

US 2017/0187479 A1 Jun. 29, 2017

(30) Foreign Application Priority Data

Dec. 24, 2015 (JP) .................................. 2015-252376

(51) Int. Cl.
*H04J 3/06* (2006.01)
*H04M 11/02* (2006.01)

(52) U.S. Cl.
CPC ......... *H04J 3/0638* (2013.01); *H04M 11/025* (2013.01)

(58) Field of Classification Search
CPC .................................................. H04J 3/0638
See application file for complete search history.

(56) References Cited

U.S. PATENT DOCUMENTS

| | | | | |
|---|---|---|---|---|
| 2005/0198396 A1* | 9/2005 | Horne | ..................... | G06F 15/16 709/248 |
| 2007/0047712 A1* | 3/2007 | Gross | ................... | H04M 11/025 379/167.01 |
| 2007/0222578 A1* | 9/2007 | Iwamura | ................ | G08B 25/04 340/538 |
| 2007/0230284 A1* | 10/2007 | Singhi | .................... | G04C 11/04 368/46 |

FOREIGN PATENT DOCUMENTS

| | | |
|---|---|---|
| JP | 2006-074183 A | 3/2006 |
| JP | 2007-124227 A | 5/2007 |
| JP | 2010-081122 A | 4/2010 |

* cited by examiner

*Primary Examiner* — Angel T Brockman
(74) *Attorney, Agent, or Firm* — Seed IP Law Group LLP

(57) ABSTRACT

An intercom system includes first and second communication networks, a network connector (cable connector, reception driver, and transmission driver), an operation setter, and a connection controller. Each of the first and second communication networks includes an entrance slave device and an intercom master device, and performs communication by time division duplex. The network connector is used for connecting the communication networks. The operation setter sets share or unshare in order to indicate whether or not information stored in a slot is shared between the first communication network and the second communication network, for each slot. The connection controller controls the network connector to perform connection or disconnection (operation of transmission driver) between the first communication network and the second communication network, in accordance with settings of the share or the unshare.

7 Claims, 21 Drawing Sheets

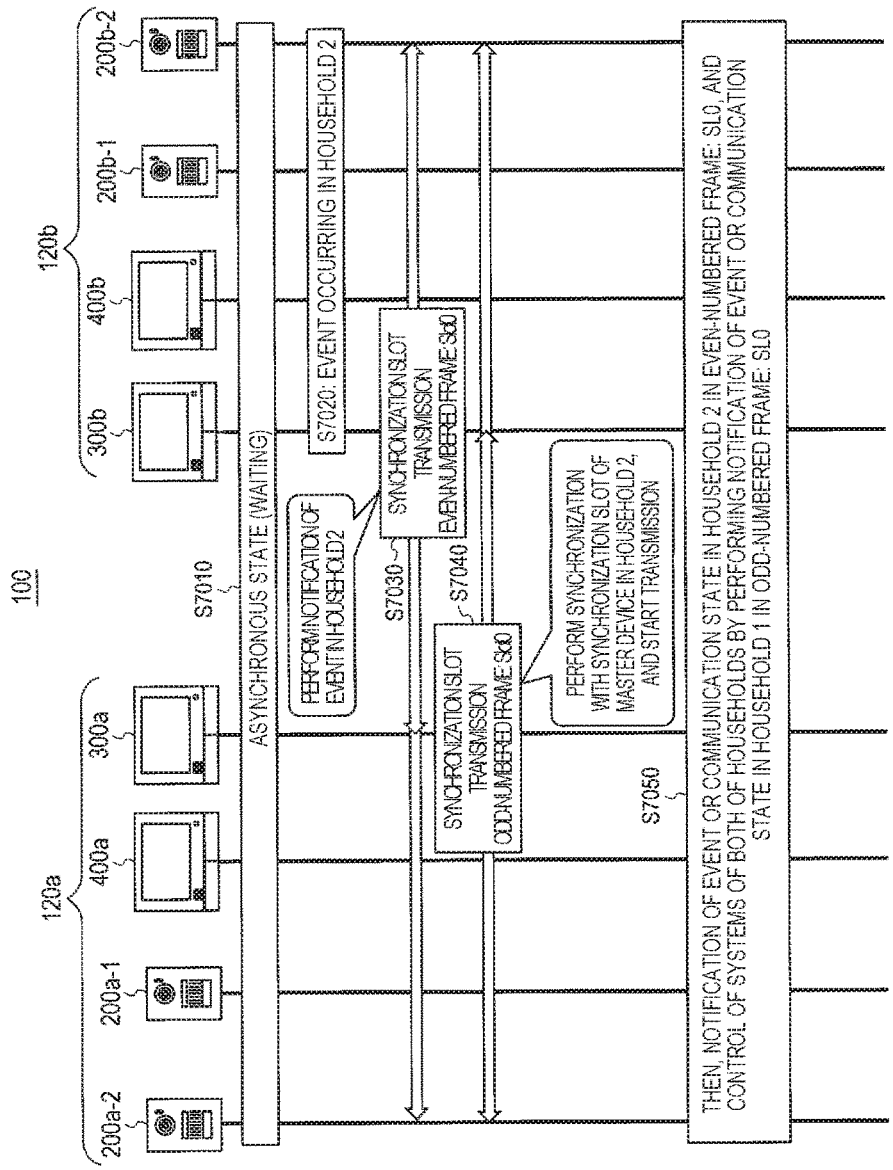

INTERCOM SYSTEM AND COMMUNICATION CONTROL METHOD

BACKGROUND

1. Technical Field

The present disclosure relates to an intercom system and a communication control method in the intercom system.

2. Description of the Related Art

An intercom system in which confirmation of a visitor into an entrance or a conversation with the visitor can be performed in a building has been widely used. Such an intercom system includes an entrance slave device installed at an entrance, and an intercom master device. The intercom master device is installed in a building and can monitor an image. The intercom system may further include various additional devices such as an additionally-installed monitor.

However, since the conventional intercom system which is the current mainstream is operated by using a method in which an image signal is transmitted in a manner of an analog signal, the conventional intercom system is easily affected by a noise. In addition, an influence on a channel causes distortion of a waveform of a signal or causes an increase of the degree of attenuation. Thus, image transmission with high quality is difficult. Accordingly, an intercom system in which communication between one intercom master device and a connection device connected to the master device is performed by using a digital signal has been proposed (For example, see Japanese Patent Unexamined Publication No. 2007-124227).

In one intercom system, one intercom master device and a connection device connected to the one intercom master device are linked to each other by digital communication. If an intercom system which is configured by one intercom master device and a connection device connected to the one intercom master device by digital communication is considered as one communication network, it is needed to consider that a plurality of communication networks are connected to each other with high convenience. For example, in a case where two communication networks are connected to each other so as to construct an intercom system for a two-household house, if a visitor into an entrance for the parent household can be confirmed in a space for the child household in addition to a space for the parent household, the intercom system may be conveniently used. In order to realize such a function, it is considered that a communication network of an intercom system for the parent household and a communication network of an intercom system for the child household are connected to each other, and various types of information such as image data are shared by both of the communication networks.

However, if a plurality of communication networks is facilely connected to each other, contrarily, the convenience of the intercom system may be damaged. For example, if an image at an entrance for the child household is transmitted to the communication network of the intercom system for the parent household even though the image is not necessary for the parent household, communication resources on the parent household side may be unnecessarily consumed, and communication quality on the parent household may be deteriorated.

SUMMARY

An object of the present disclosure is to provide an intercom system and a communication control method which can achieve improvement of convenience when being used in a plurality of households.

An intercom system according to the present disclosure includes a first communication network in which communication is performed between a plurality of terminals including a first entrance slave device and a first intercom master device, and a second communication network in which communication is performed between a plurality of terminals including a second entrance slave device and a second intercom master device. The first communication network and the second communication network are connected to each other in an intercom system. At least one of the first intercom master device and the second intercom master device is configured to set share or unshare for indicating where or not information stored in a time slot is shared between the first communication network and the second communication network, for each time slot, and to control connection or disconnection between the first communication network and the second communication network, in accordance with settings of the share or the unshare.

A communication control method according to the present disclosure is a communication control method in an intercom system in which a first communication network in which communication is performed between a plurality of terminals including a first entrance slave device and a first intercom master device, and a second communication network in which communication is performed between a plurality of terminals including a second entrance slave device and a second intercom master device are provided, and the first communication network and the second communication network are connected to each other. At least one of the first intercom master device and the second intercom master device sets share or unshare indicating whether or not information stored in a time slot is shared between the first communication network and the second communication network, for each time slot, and controls connection or disconnection between the first communication network and the second communication network, in accordance with settings of the share or the unshare.

According to the present disclosure, it is possible to achieve improvement of convenience in being used in a plurality of households.

BRIEF DESCRIPTION OF THE DRAWINGS

FIG. 21 is a sequence diagram illustrating an example of an operation in a case where a predetermined event occurs in advance in a second communication network of the intercom system according to Exemplary Embodiment 3.

DETAILED DESCRIPTION

Hereinafter, exemplary embodiments of the present disclosure will be described in detail with reference to the drawings.

Exemplary Embodiment 1

This exemplary embodiment is an example of a case where one of a plurality of intercom master devices controls an operation of an intercom system.
Outline of System Firstly, an outline of an intercom system according to an exemplary embodiment of the present disclosure will be described.

Figure 1:
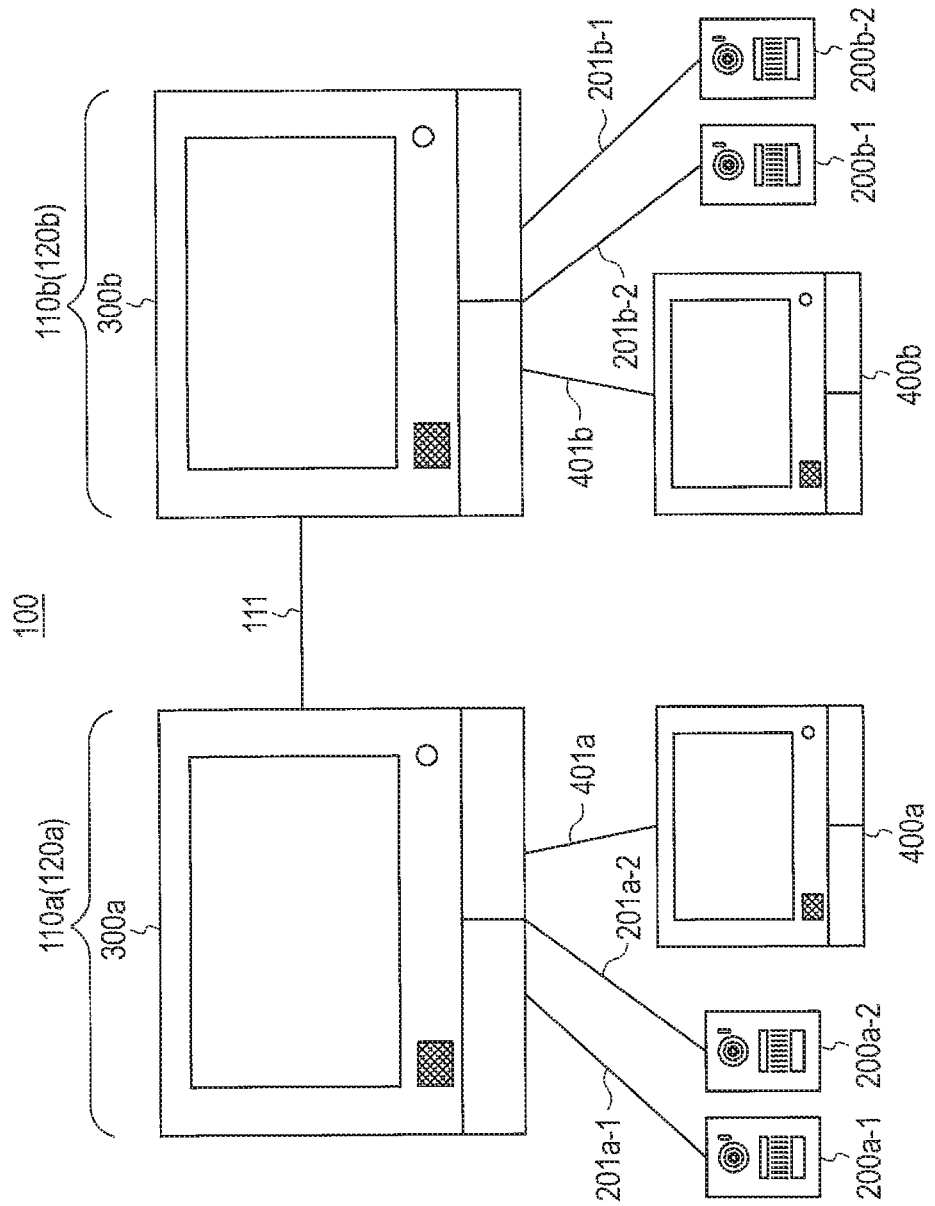
FIG. 1 is a system configuration diagram illustrating an example of a configuration of an intercom system according to Exemplary Embodiment 1 of the present disclosure.

FIG. 1 is a system configuration diagram illustrating an example of a configuration of an intercom system according to this exemplary embodiment. The intercom system according to this exemplary embodiment is a system installed in, for example, a two-household house in which a residential space is divided into a space for a parent household and a space for a child household.

As illustrated in FIG. 1, intercom system 100 includes first intercom system 110a, second intercom system 110b, and communication cable 111. First intercom system 110a is disposed in the residential space for the parent household. Second intercom system 110b is disposed in the residential space for the child household. The communication cable 111 is used for connecting first intercom system 110a and second intercom system 110b.

First intercom system 110a includes two first entrance slave devices 200a-1 and 200a-2, first intercom master device 300a, and first additional monitor 400a. Each of first entrance slave devices 200a-1 and 200a-2, and first additional monitor 400a is connected to first intercom master device 300a through communication cables 201a-1, 201a-2, and 401a.

A data transmission function is performed by first intercom master device 300a, and thus first intercom system 110a forms a star-type communication network (referred to as "first communication network 120a" below) in which the first intercom master device 300a is set as the center. First communication network 120a will be described later. However, first communication network 120a is a communication network in which switching a transmission subject is performed by using a slot (time slot) as a unit, so as to perform communication by time division duplex.

Second intercom system 110b includes two second entrance slave devices 200b-1 and 200b-2, second intercom master device 300b, and second additional monitor 400b. Each of second entrance slave devices 200b-1 and 200b-2, and second additional monitor 400b is connected to first intercom master device 300b through communication cables 201b-1, 201b-2, and 401b.

A data transmission function is performed by second intercom master device 300b, and thus second intercom system 110b forms a star-type communication network (referred to as "second communication network 120b" below) in which second intercom master device 300b is set as the center. Second communication network 120b will be described later. However, second communication network 120b is a communication network in which communication is performed by predetermined time division duplex, similarly to first communication network 120a.

Above-described communication cable 111 connects first intercom master device 300a and second intercom master device 300b to each other. Each of communication cables 111, 201a-1, 201a-2, 401a, 201b-1, 201b-2, and 401b is a two-wire cable which is formed from a pair of copper wires.

Since first intercom master device 300a and second intercom master device 300b have the same configuration, first intercom master device 300a and second intercom master device 300b will be described appropriately collectively as "intercom master device 300". Since first entrance slave devices 200a-1 and 200a-2, and second entrance slave devices 200b-1 and 200b-2 have the same configuration, first entrance slave devices 200a-1 and 200a-2, and second entrance slave devices 200b-1 and 200b-2 will be described appropriately collectively as "entrance slave device 200". Since first additional monitor 400a and second additional monitor 400b have the same configuration, first additional monitor 400a and second additional monitor 400b will be described appropriately collectively as "additional monitor 400".

Each of entrance slave device 200, intercom master device 300, and additional monitor 400 is a terminal functioning as a communication subject, and will be appropriately collectively referred to as "a terminal".

Entrance slave device 200 is provided at an entrance of each of the residential space for the parent household and the residential space for the child household. Intercom master device 300 and additional monitor 400 are provided in a house of each of the residential space for the parent household and the residential space for the child household. The intercom master device 300 and the additional monitor 400 are fixed to a wall, or are placed on a table, a stand, or the like.

When a predetermined operation such as an operation of a call button is performed, entrance slave device 200 generates a control signal which includes a call signal. Entrance slave device 200 captures an image of the vicinity of the entrance so as to generate image data, and acquires sound of the vicinity of the entrance so as to generate sound data. Entrance slave device 200 performs, for example, output of sound, in accordance with sound data received from intercom master device 300, and control information.

Intercom master device 300 communicates with entrance slave device 200. Intercom master device 300 receives a control signal, image data, and sound data from the entrance slave device 200, and transmits the sound data and the control information. Intercom master device 300 communicates with additional monitor 400. Intercom master device 300 transmits the control signal, the image data, and the sound data (appropriately referred to as "various types of slave device data" below) which have been received from entrance slave device 200, to additional monitor 400. Intercom master device 300 transmits the sound data and the control information which have been received from the additional monitor 400, to entrance slave device 200.

When the call signal is received from entrance slave device 200, intercom master device 300 outputs a ringing tone, and outputs an image and sound of the vicinity of the entrance. If a predetermined operation such as an operation of a response button is performed, intercom master device 300 acquires sound of the vicinity of intercom master device 300 so as to generate sound data, and transmits the generated sound data to entrance slave device 200 along with control information.

Further, intercom master device 300 communicates with the other intercom master device 300 of intercom system 100. Intercom master device 300 performs predetermined processing in addition to perform communication of information with the other intercom master device 300. For example, intercom master device 300 transmits various types of slave device data received from entrance slave device 200 to the other intercom master device 300 outputs or transmits sound or an image regarding the various types of slave device data which have been received from the other intercom master device 300. That is, first intercom system 110a and second intercom system 110b (first communication network 120a and second communication network 120b) are connected to each other through communication cable 111 by first intercom master device 300a and second intercom master device 300b.

Additional monitor 400 outputs a ringing tone and outputs an image and sound of the vicinity of the entrance, when receiving the call signal from intercom master device 300. If a predetermined operation such as an operation of a response button is performed, additional monitor 400 acquires sound of the vicinity of additional monitor 400 so as to generate sound data, and transmits the generated sound data to intercom master device 300 along with control information.

In the following descriptions, a direction from entrance slave device 200 or additional monitor 400 to intercom master device 300 is appropriately referred to as "an uplink direction". A packet and a signal which are transmitted from entrance slave device 200 or additional monitor 400 in the uplink direction are appropriately respectively referred to as "an uplink packet" and "an uplink signal". A direction from intercom master device 300 to entrance slave device 200 or additional monitor 400 is appropriately referred to as "a downlink direction". A packet and a signal which are transmitted from intercom master device 300 in the downlink direction are appropriately respectively referred to as "a downlink packet" and "a downlink signal".

Frame Structure and Time-Slot Structure

Here, a frame structure and a slot structure in the above-described time division duplex will be described.

Figure 2:
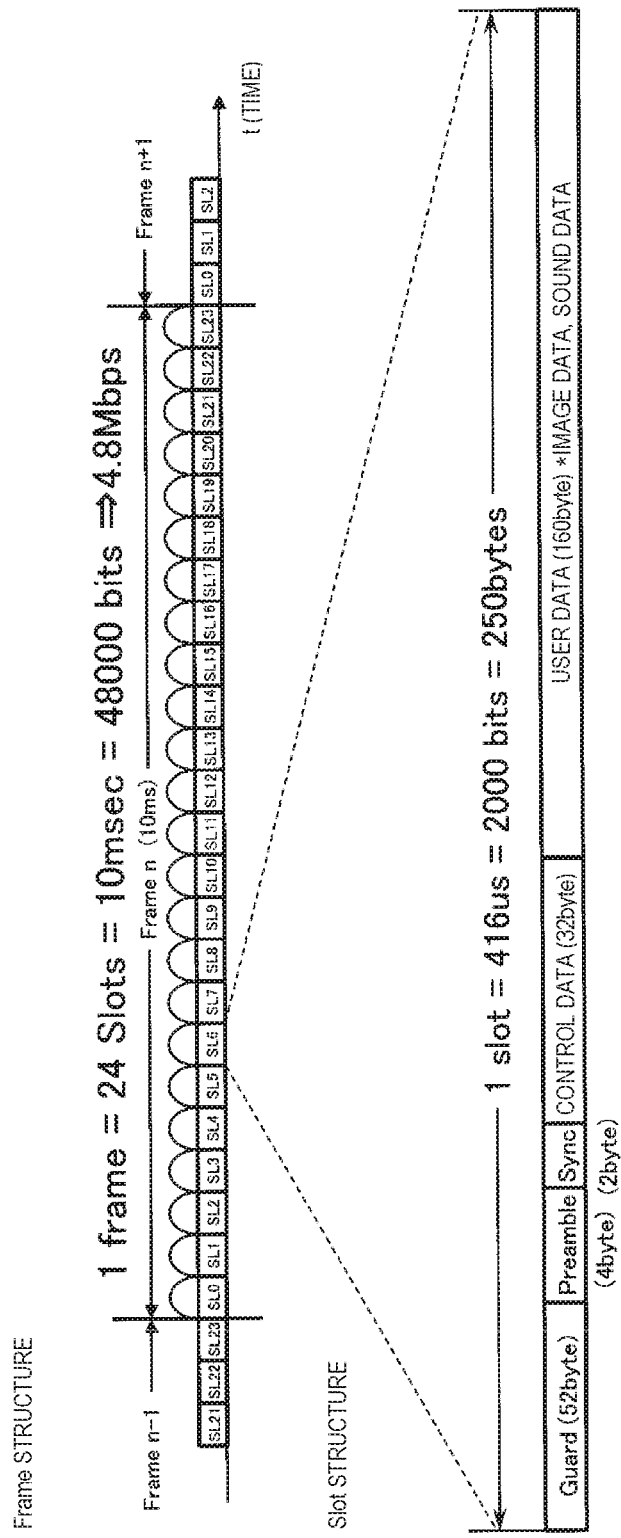
FIG. 2 is a schematic diagram illustrating an example of a frame structure and a slot structure in Exemplary Embodiment 1.

FIG. 2 is a schematic diagram illustrating an example of the frame structure and the slot structure.

As illustrated in FIG. 2, each frame has an area of 48000 bits. Each frame corresponds to a period of 10 ms (milliseconds) and a bit rate of 4.8 Mbps. Each frame is split into 24 slots. Accordingly, each slot has an area of 2000 bits=250 bytes, and corresponds to a period of 0.416 ms and a bit rate of 4.8 Mbps. In the following descriptions, 24 slots constituting one frame are referred to as the 0th to the 23rd slots (SL0 to SL23) in an order from the front, respectively.

Each slot is separated into a guard space (Guard) of 52 bytes, a preamble field of 4 bytes, a synchronization field (Sync) of 2 bytes, a control data field of 32 bytes, and a user data field of 160 bytes.

The guard space is a period for avoiding collision between slots due to a propagation delay time difference, a clock jitter, and the like. Preamble data (which will be described later) having a predetermined unique pattern is added to the preamble field. A predetermined synchronization pattern is added to the synchronization field. Control data relating to data which is stored in the subsequent user data field is added to the control data field. Image data and sound data are added to the user data field.

A slot group constituting each frame includes a plurality of data slots, and a synchronization slot. The data slot is a slot for storing image data, sound data, or the like. The synchronization slot is a slot for obtaining synchronization in communication, and is a slot for storing slot management information which defines the plurality of data slots.

Figure 3:
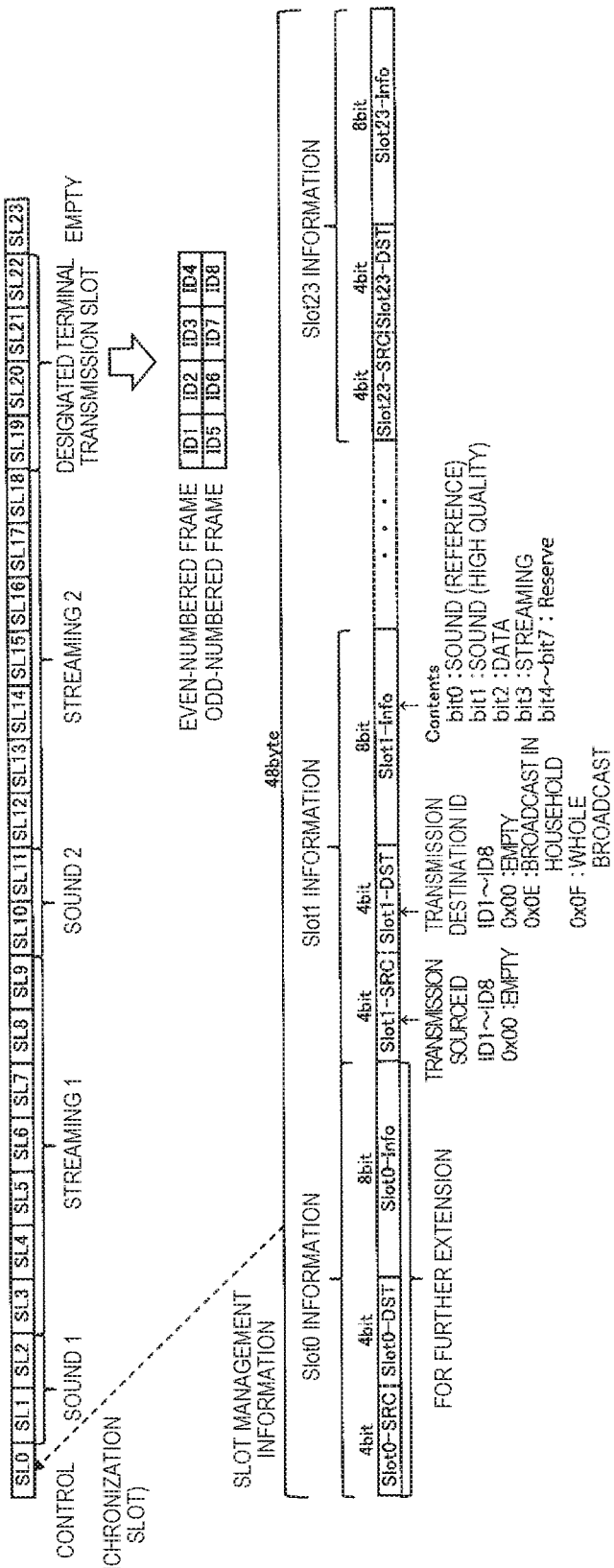
FIG. 3 is a schematic diagram illustrating an example of a position and a structure of a synchronization slot in Exemplary Embodiment 1.

FIG. 3 is a schematic diagram illustrating an example of a position and a configuration of the synchronization slot.

As illustrated in FIG. 3, the synchronization slot is the 0th slot (SL0), and is positioned at the leading of each frame. The synchronization slot includes slot management information which is disposed at the leading portion of, for example, a user data area, and is formed from 48 bytes. The slot management information is formed from the 0th to the 23rd pieces of slot information which correspond to the 0th to the 23rd slots, respectively. Each piece of slot information is formed from an SRC region of 4 bits, a DST region of 4 bits, and an Info region of 8 bits.

The SRC region is a region for writing identification information (transmission source ID) of a terminal as a transmission source of information stored in the corresponding slot. The DST region is a region for writing identification information (transmission destination ID) of a terminal as a transmission destination of information stored in the corresponding slot. The Info region is a slot for writing a contents type of user data stored in the corresponding slot.

That is, the slot management information indicates, for each data slot, an use authority of the slot, for example, indicates a terminal which can transmit information by using this slot, and indicates a terminal which is required to receive and process information transmitted in this slot. First intercom master device 300a notifies all terminals of such slot management information. Each of the terminals operates in accordance with the received slot management information. Thus, the plurality of terminals can perform communication in time division.

In a case where first communication network 120a and second communication network 120b are connected to each other, for example, an image captured by first entrance slave device 200a-1 can be also transmitted to second communication network 120b, and be displayed in second intercom master device 300b.

However, for example, in a case where an image captured by second entrance slave device 200b-1 is also transmitted to first communication network 120a, and thus such transmission is not required, communication resources of first communication network 120a are wastefully consumed.

Thus, in intercom system 100, a function of a synchronization slot of a communication frame (referred to as "an even-numbered frame" below) of which a frame number is even (0, 2, 4, . . . ) is different from a function of a synchronization slot of a communication frame (referred to as "an odd-numbered frame" below) of which a frame number is odd (1, 3, 5, . . . ).

Specifically, first intercom master device 300a defines a transmission and reception timing of each of the terminals in first communication network 120a by using slot management information of the even-numbered frame. First intercom master device 300a defines a transmission and reception timing of each of the terminals in second communication network 120b by using slot management information of the odd-numbered frame. Thus, intercom system 100 can assign different slots to first communication network 120a and second communication network 120b.

First intercom master device 300a transmits (pieces of slot management information of) all synchronization slots to both of first communication network 120a and second communication network 120b, without depending on whether a frame is an even-numbered frame or an odd-numbered frame. Each of the terminals determines a piece of slot management information to be used as a rule, based on details of each piece of slot management information (details relating to assignment to a designated-terminal transmission slot which will be described later). In the following descriptions, a terminal which is required to follow an use authority of each data slot indicated by slot management information of a certain frame is referred to as "a designated terminal" for the frame.

For example, intercom system 100 ensures the 19th to the 22nd slots (SL19 to SL22, see FIG. 3) as a data slot used when the designated terminal for the frame performs transmission (referred to as "a designated-terminal transmission slot" below), for each frame. The position (slot number) of the designated-terminal transmission slot is known by all of the terminals.

First intercom master device 300a assigns designated-terminal transmission frames to each of the devices in first communication network 120a in the even-numbered frame, and assigns designated-terminal transmission frames to each of the devices in second communication network 120b in the odd-numbered frame. Each of the terminals determines whether or not a transmission source ID regarding the 19th to the 22nd slots in the slot management information of the received frame includes an ID of the terminal, and thus determines whether or not the terminal is a designated terminal for the received frame.

When the terminal corresponds to a designated terminal for a certain frame (referred to as "a first frame" below), each of the terminals operates in the first frame, in accordance with an use authority indicated by slot management information of the first frame. When the terminal does not correspond to the designated terminal for the first frame, and corresponds to a designated terminal for another frame which has been previously received (for example, frame ahead of one frame, referred to as "a second frame" below), each of the terminals operates in the first frame, in accordance with an use authority indicated by slot management information of the second frame.

That is, each of the terminals in first communication network 120a operates in all frames, in accordance with slot management information of an even-numbered frame. Each of the terminals in second communication network 120b operates in all frames, in accordance with slot management information of an odd-numbered frame.

Further, each intercom master device 300 determines whether or not to perform transmission and reception through communication cable 111, in accordance with whether or not a set of a transmission source ID and a transmission destination ID in each slot of the slot management information belongs to any of first communication network 120a and second communication network 120b. That is, each intercom master device 300 controls connection or disconnection between first communication network 120a and second communication network 120b, for each slot, in accordance with whether or not information is shared between first communication network 120a and second communication network 120b.

Thus, intercom system 100 can share information to be shared between first communication network 120a and second communication network 120b, and can simultaneously in-household communications having different contents. That is, intercom system 100 can obtain both of sharing information and optimizing used communication resources.

Configuration of Terminal

Next, a configuration of each terminal in intercom system 100 will be described.

Configuration of Entrance Slave Device

Figure 4:
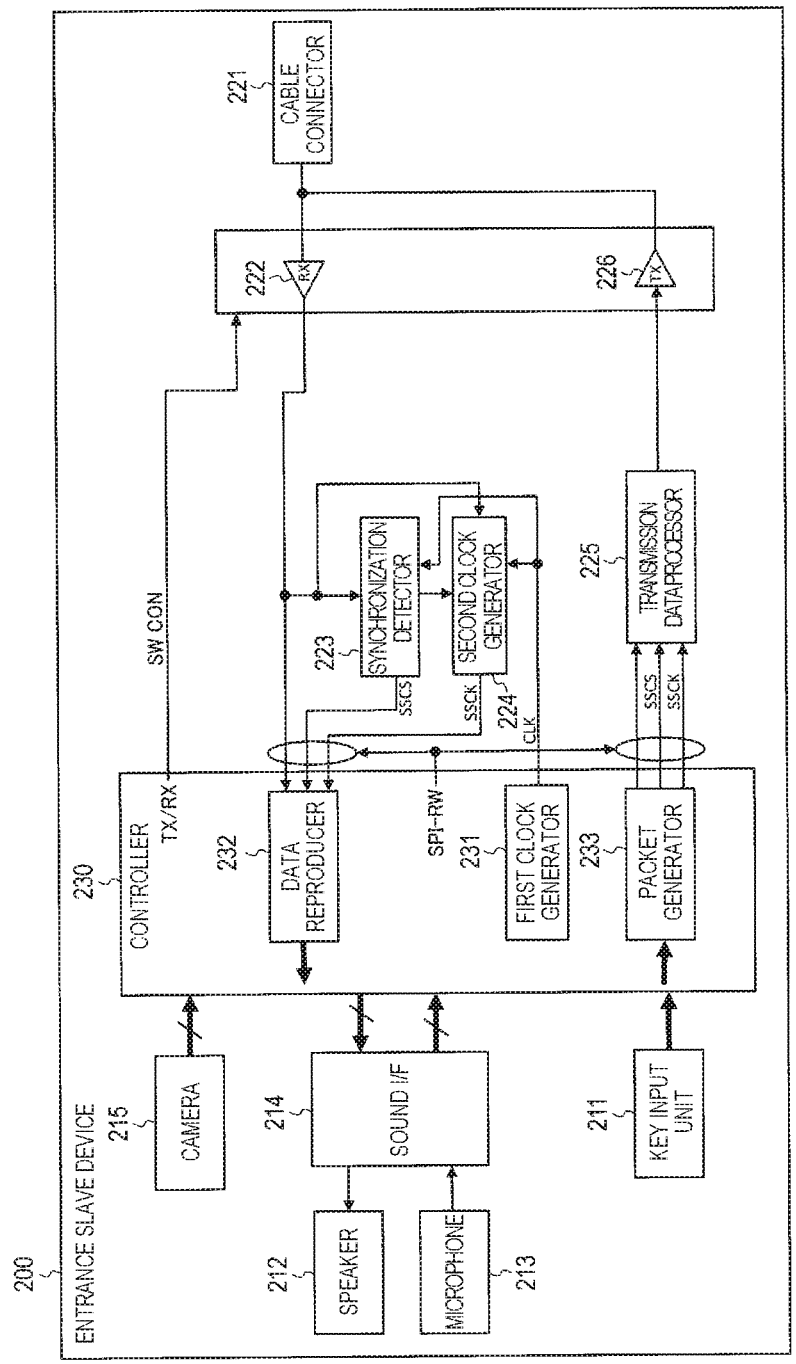
FIG. 4 is a block diagram illustrating an example of a configuration of an entrance slave device in Exemplary Embodiment 1.

FIG. 4 is a block diagram illustrating an example of a configuration of entrance slave device 200.

As illustrated in FIG. 4, entrance slave device 200 includes key input unit 211, speaker 212, microphone 213, sound I/F (interface) 214, and a camera 215. Entrance slave device 200 includes cable connector 221, reception driver 222, synchronization detector 223, second clock generator 224, transmission data processor 225, transmission driver 226, and controller 230. Controller 230 includes first clock generator 231, data reproducer 232, and packet generator 233.

Key input unit 211 includes a call button. When the call button is operated, key input unit 211 outputs a call signal indicating that the call button is operated, to controller 230.

Speaker 212 converts analog sound data output from sound I/F 214 into sound, and outputs the sound.

Microphone 213 collects sound of the vicinity thereof, converts the resultant of the collection into analog sound data, and outputs the analog sound data to sound I/F 214.

Sound I/F 214 converts digital sound data output from controller 230, into analog sound data. Sound I/F 214 adjusts a signal level, and outputs a signal having an adjusted signal level, to speaker 212. Sound I/F 214 adjusts a signal level of analog sound data output from microphone 213. Sound I/F 214 converts the analog sound data into digital sound data, and outputs the digital sound data to controller 230. The analog-digital conversion is performed by an A/D converter and a D/A converter (not illustrated).

Predetermined sound compression processing is performed on data which is obtained by performing digital conversion of the analog sound data output from microphone 213. Sound I/F 214 may output data obtained by performing the sound compression processing, to controller 230 as digital sound data. In a case where digital sound data output from controller 230 is the data obtained by performing the predetermined sound compression processing, sound I/F 214 performs predetermined sound decompression processing on this digital sound data, and then performs digital-to-analog conversion.

Camera 215 includes a digital camera. Camera 215 captures an image of the entrance so as to generate digital image data, and outputs the generated digital image data to controller 230. Camera 215 may have an encoder module mounted therein. That is, camera 215 may output data obtained by performing predetermined image compression processing such as H.264 on image data output from the digital camera, to controller 230 as digital image data.

Cable connector 221 includes a connection terminal for communication cable 201 (see FIG. 1) which is a two-wire cable, and connects one end of communication cable 201 with reception driver 222 and transmission driver 226 in a state where a signal can be transmitted between the one end of communication cable 201, and reception driver 222 and transmission driver 226.

Reception driver 222 receives a downlink signal transmitted from intercom master device 300, through cable connector 221. Reception driver 222 outputs the downlink signal to synchronization detector 223, second clock generator 224, and data reproducer 232 in a reception section of which an instruction is performed by a switching control signal (SW CON) from controller 230.

Synchronization detector 223 detects synchronization (the leading timing of each bit in reception data) with intercom master device 300 by using a clock (CLK) of a first frequency output from first clock generator 231, and by using preamble data included in the downlink signal which has been output from reception driver 222. Synchronization detector 223 outputs a triggering signal to second clock generator 224 and outputs an enable signal (SSCS) to data reproducer 232 at a timing when the unique pattern of the preamble data is detected. The triggering signal functions as a criterion for starting an output of the clock. The enable signal (SSCS) is used for permitting the data reproduction operation.

Second clock generator 224 generates a clock (SSCK) of a second frequency (for example, 4.8 MHz) which corresponds to the bit rate of the reception data, based on the clock (CLK) of the first frequency which has been output from first clock generator 231, at a timing of which an instruction is performed from synchronization detector 223. Second clock generator 224 sequentially outputs the generated clock to data reproducer 232.

If the enable signal (SSCS) is input from packet generator 233, transmission data processor 225 modulates data of an uplink packet output from packet generator 233 by using a clock (SSCK) of the second frequency output from packet generator 233. Thus, transmission data processor 225 generates an uplink signal. Transmission data processor 225 outputs the generated uplink signal to transmission driver 226.

Transmission driver 226 transmits the uplink signal to intercom master device 300 through cable connector 221 in a transmission section of which an instruction is performed by the switching control signal (SW CON) from controller 230.

Controller 230 controls the units of entrance slave device 200. Controller 230 outputs a switching control signal (SW CON) to transmission driver 226 and reception driver 222. The switching control signal (SW CON) is used for an instruction of a transmission section in which transmission is permitted, and a reception section in which reception is permitted. Controller 230 transmits the call signal output from key input unit 211, to intercom master device 300.

First clock generator 231 of controller 230 generates a clock (CLK) of the first frequency (for example, 48 MHz (n=10)), which is a clock for sampling reception data. The first frequency corresponds to n times (n is equal to or more than 1) a bit rate of the reception data based on a crystal oscillation frequency. First clock generator 231 sequentially outputs the generated clock to synchronization detector 223 and second clock generator 224.

If the enable signal (SSCS) is input from synchronization detector 223, data reproducer 232 of controller 230 demodulates a downlink signal output from reception driver 222 by using a clock (SSCK) of the second frequency output from second clock generator 224. Thus, data reproducer 232 acquires slot management information and a downlink packet. Data reproducer 232 outputs digital sound data included in the downlink packet, to sound I/F 214.

Packet generator 233 of controller 230 generates an uplink packet for realizing a call with an image. Specifically, packet generator 233 appropriately splits digital sound data output from sound I/F 214, and digital image data output from camera 215. Packet generator 233 writes pieces of data obtained by the split, in user data field of slots, respectively. Packet generator 233 writes control data in the control data field of each slot. Packet generator 233 writes preamble data and a synchronization pattern in each slot, so as to generate an uplink packet (transmission data). Packet generator 233 generates an enable signal (SSCS) for transmission, and a clock (SSCK) of a second frequency (for example, 4.8 MHz) for transmission. Packet generator 233 synchronizes the uplink packet with the enable signal (SSCS) and the clock (SSCK) for the transmission, and outputs the uplink packet to transmission data processor 225.

As described above, controller 230 determines whether or not entrance slave device 200 corresponds to a designated terminal for a certain frame, and operates entrance slave device 200 in accordance with an use authority indicated by slot management information (see FIG. 3) of a frame in which entrance slave device 200 is defined as a designated terminal. The determination is performed, for example, in such a manner that data reproducer 232 acquires (holds) a terminal ID of entrance slave device 200, and determines whether or not the terminal ID is included in the transmission source ID of the designated-terminal transmission slot in the received synchronization slot.

Controller 230 specifies a reception section (reception slot) in which entrance slave device 200 is required to perform reception, and a transmission section (transmission slot) in which entrance slave device 200 is required to perform transmission, based on the slot management information. Controller 230 controls an output of the switching control signal (SW CON) and operations of data reproducer 232 and packet generator 233 so as to perform reception in the specified reception section, and to perform transmission in the specified transmission section.

With such a configuration, entrance slave device 200 can transmit and receive various types of data in time division duplex, in accordance with slot management information of a frame in which entrance slave device 200 is defined as a designated terminal.

Configuration of Intercom Master Device

Next, a configuration of intercom master device 300 will be described.

Figure 5:
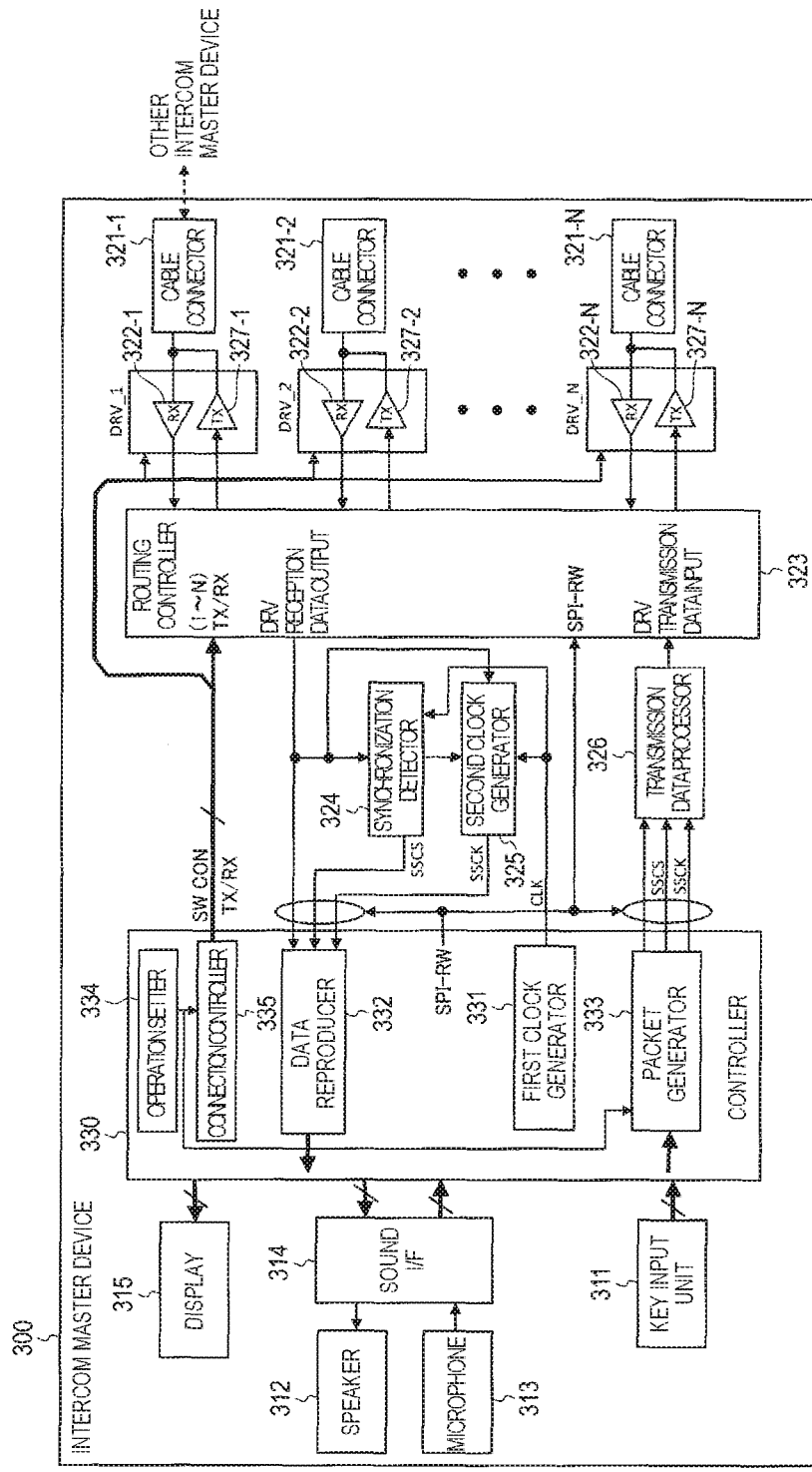
FIG. 5 is a block diagram illustrating an example of a configuration of an intercom master device in Exemplary Embodiment 1.

FIG. 5 is a block diagram illustrating an example of the configuration of intercom master device 300.

As illustrated in FIG. 5, intercom master device 300 includes key input unit 311, speaker 312, microphone 313, sound I/F 314, and display 315. Intercom master device 300 includes cable connector 321, reception driver 322, routing controller 323, synchronization detector 324, second clock generator 325, transmission data processor 326, transmission driver 327, and controller 330. Controller 330 includes first clock generator 331, data reproducer 332, packet generator 333, operation setter 334, and connection controller 335 in the inside thereof. Intercom master device 300 includes N sets (N is a natural number, 4 in this exemplary embodiment) of which each includes cable connector 321, reception driver 322, and transmission driver 327.

Key input unit 311 includes a response button. When the response button is operated, key input unit 311 outputs a signal indicating that the response button is operated, to controller 330.

Speaker 312 converts analog sound data output from sound I/F 314 into sound, and outputs the sound.

Microphone 313 collects sound of the vicinity thereof, converts the resultant of the collection into analog sound data, and outputs the analog sound data to sound I/F 314.

Sound I/F 314 converts digital sound data output from controller 330, into analog sound data. Sound I/F 314 adjusts a signal level, and outputs a signal having an adjusted signal level, to speaker 312. Sound I/F 314 adjusts a signal level of analog sound data output from microphone 313. Sound I/F 314 converts the analog sound data into digital sound data, and outputs the digital sound data to controller 330. The analog-digital conversion is performed by an A/D converter and a D/A converter (not illustrated).

Predetermined sound compression processing is performed on data which is obtained by performing digital conversion of the analog sound data output from microphone 313. Sound I/F 314 may output data obtained by performing the sound compression processing, to controller 330 as digital sound data. In a case where digital sound data output from controller 330 is the data obtained by performing the predetermined sound compression processing, sound I/F 314 performs predetermined sound decompression processing on this digital sound data, and then performs digital-to-analog conversion.

Display 315 includes a liquid crystal display with a touch panel. Display 315 reproduces digital image data output from controller 330 and displays an image of the entrance. In a case where the digital image data output from controller 330 is data obtained by performing predetermined image compression processing, display 315 performs predetermined image decompression processing on this digital image data, and performs image display.

Cable connector 321-i (i is any integer of 1 to N) includes a connection terminal for communication cables 201, 401, and 111 (see FIG. 1) which are two-wire cables. Cable connector 321-i connects one end of each of communication cables 201, 401, and 111 with transmission driver 327-i and reception driver 322-i in a state where a signal can be transmitted between the one end of each of communication cables 201, 401, and 111, and transmission driver 327-i and reception driver 322-i. FIG. 5 illustrates a case where cable connector 321-1 is connected to the other intercom master device 300.

Reception driver 322-i receives a signal transmitted from entrance slave device 200, additional monitor 400, or the other intercom master device 300, through cable connector 321-i. Reception driver 322-i outputs a reception signal to routing controller 323 in a reception section of which an instruction is performed by the switching control signal (SW CON) output from controller 330.

Routing controller 323 performs routing of the reception signal which has been transmitted from the other terminal and has been output from reception driver 322-i. That is, in a case where the reception signal is for intercom master device 300, routing controller 323 outputs the reception signal to synchronization detector 324, second clock generator 325, and data reproducer 332. In a case where the reception signal is for the other terminal, routing controller 323 outputs the reception signal to corresponding transmission driver 327-i. Routing controller 323 outputs a transmission signal which has been output from transmission data processor 326 and is for the other terminal, to corresponding transmission driver 327-i.

Synchronization detector 324 detects synchronization (the leading timing of each bit in reception data) with entrance slave device 200 by using a clock (CLK) of a first frequency output from first clock generator 331, and by using preamble data included in the reception signal which has been output from routing controller 323. Synchronization detector 324 outputs a triggering signal to second clock generator 325 and outputs an enable signal (SSCS) to data reproducer 332 at a timing when the unique pattern of the preamble data is detected. The triggering signal functions as a criterion for starting an output of the clock. The enable signal (SSCS) is used for permitting the data reproduction operation.

Second clock generator 325 generates a clock (SSCK) of a second frequency (for example, 4.8 MHz) which corresponds to the bit rate of the reception data, based on the clock (CLK) of the first frequency which has been output from first clock generator 331, at a timing of which an instruction is performed from synchronization detector 324. Second clock generator 325 sequentially outputs the generated clock to data reproducer 332.

If the enable signal (SSCS) is input from packet generator 333, transmission data processor 326 modulates data of a downlink packet output from packet generator 333 by using a clock (SSCK) of the second frequency output from packet generator 333. Thus, transmission data processor 326 generates a transmission signal. Transmission data processor 326 outputs the generated transmission signal to routing controller 323.

Transmission driver 327-1 transmits the transmission signal output from routing controller 323, to the other intercom master device 300 through cable connector 321-1 in a transmission section of which an instruction is performed by the switching control signal (SW CON) from controller 330. Transmission driver 327-i (in this case, i is not 1) transmits the transmission signal output from routing controller 323, to entrance slave device 200 or additional monitor 400 through cable connector 321-i in the transmission section of which an instruction is performed by the switching control signal (SW CON) from controller 330.

Controller 330 controls the units of intercom master device 300. Controller 330 outputs a switching control signal (SW CON) to each of transmission drivers 327-i, each of reception drivers 322-i, and routing controller 323. The switching control signal (SW CON) is used for an instruction of a transmission section in which transmission is permitted, and a reception section in which reception is permitted.

First clock generator 331 of controller 330 generates a clock (CLK) of the first frequency (for example, 48 MHz (n=10)), which is a clock for sampling reception data. The first frequency corresponds to n times the bit rate of the reception data based on the crystal oscillation frequency. First clock generator 331 sequentially outputs the generated clock to synchronization detector 324 and second clock generator 325.

If the enable signal (SSCS) is input from synchronization detector 324, data reproducer 332 of controller 330 demodulates a reception signal output from routing controller 323 by using a clock (SSCK) of the second frequency output from second clock generator 325, so as to acquire a reception packet. Data reproducer 332 outputs digital sound data included in the reception packet, to sound I/F 314. Data reproducer 332 outputs digital image data included in the reception packet to display 315.

As described above, controller 330 determines whether or not intercom master device 300 corresponds to a designated terminal for a certain frame, and operates intercom master device 300 in accordance with an use authority indicated by slot management information (see FIG. 3) of a frame in which intercom master device 300 is defined as a designated terminal. The determination is performed, for example, in such a manner that data reproducer 332 acquires (holds) a terminal ID of intercom master device 300, and determines whether or not the terminal ID is included in the transmission source ID of the designated-terminal transmission slot in the received/transmitted synchronization slot.

Controller 330 specifies a reception section (reception slot) in which intercom master device 300 is required to perform reception, and a transmission section (transmission slot) in which intercom master device 300 is required to perform transmission, based on the slot management information. Controller 330 controls an output of the switching control signal (SW CON) and operations of data reproducer 332 and packet generator 333 so as to perform reception in the specified reception section, and to perform transmission in the specified transmission section.

Packet generator 333 of controller 330 generates a downlink packet for realizing a call with an image. Specifically, packet generator 333 appropriately splits digital sound data output from sound I/F 314. Packet generator 333 writes pieces of data obtained by the split, in user data field of slots, respectively. Packet generator 333 writes control data in the control data field of each slot. Packet generator 333 writes preamble data and a synchronization pattern in each slot, so as to generate a downlink packet (transmission data). Packet generator 333 generates an enable signal (SSCS) for transmission, and a clock (SSCK) of a second frequency (for example, 4.8 MHz) for transmission. Packet generator 333 synchronizes the downlink packet with the enable signal (SSCS) and the clock (SSCK) for the transmission, and outputs the downlink packet to transmission data processor 326.

Packet generator 333 may output control information regarding an operation of the other terminal, to transmission data processor 326. Such control information includes, for example, a camera operation (operation for a data rate, pan, tilt, a light, a shutter, a filter, and the like) of entrance slave device 200 from intercom master device 300. Such control information includes a control signal when intercom master device 300 controls operations of various sensor devices included in entrance slave device 200. Further, such control information includes control information for controlling an operation of a device (electronic key of a door and the like) which is disposed outdoor, through a wireless communication circuit (not illustrated) included in entrance slave device 200.

Cable connector 321-1, reception driver 322-1, routing controller 323, and transmission driver 327-1 can be connected to a network connector for connecting first communication network 120a and second communication network 120b.

When a predetermined event occurs, operation setter 334 of controller 330 assigns each data slot to a terminal which is required to function as a transmission source of information, in accordance with the event. For example, when intercom master device 300 receives a call signal from entrance slave device 200, operation setter 334 assigns the third to the ninth slots (SL3 to SL9), as being used for streaming transmission of first entrance slave device 200a. When the operation setter 334 responds to the call signal, the operation setter 334 assigns the first and the second slots as being used for sound communication between intercom master device 300 and entrance slave device 200. Operation setter 334 determines a transmission destination of information of each data slot. Operation setter 334 generates slot management information (see FIG. 3) based on an assignment result.

Operation setter 334 previously holds a setting pattern of a set of a transmission source ID and a transmission destination ID in each slot, for each type of an event. Such a setting pattern is acquired, for example, in such a manner that an operation of designating the other terminal to which information obtained in each terminal is transmitted is received from a user through the above-described liquid crystal display with a touch panel. Operation setter 334 generates the slot management information based on the setting pattern which corresponds to the occurred event.

At this time, operation setter 334 assigns the designated-terminal transmission slot for an even-numbered frame to the plurality of terminals in first communication network 120a, and assigns the designated-terminal transmission slot for an odd-numbered frame to the plurality of terminals in second communication network 120b. In a case where information transmitted by one communication network 120 is also transmitted to another communication network 120, operation setter 334 sets a transmission source ID and a transmission destination ID of a data slot in a frame, over first communication network 120a and second communication network 120b. In this case, operation setter 334 sets information indicating that the information is transmitted to all households instead of the transmission destination ID. In a case where information transmitted by one communication network 120 is not transmitted to another communication network 120, operation setter 334 sets the transmission source ID and the transmission destination ID of the data slot in the frame, without crossing over first communication network 120a and second communication network 120b. In this case, operation setter 334 sets information indicating that the information is transmitted in a household instead of the transmission destination ID.

That is, operation setter 334 of controller 330 sets share or unshare indicating whether or not information stored in this slot is shared between first communication network 120a and second communication network 120b.

For example, in slot information, as the transmission destination ID, "whole broadcasting" or a situation in which belonging communication network 120 sets a terminal ID of a terminal which is different from the transmission source corresponds to a situation in which "share" is set in the corresponding slot. For example, in slot information, as the transmission destination ID, "in-household broadcasting" or a situation in which belonging communication network 120 sets a terminal ID of a terminal which is the same as the transmission source corresponds to a situation in which "unshare" is set in the corresponding slot. Operation setter 334 normally sets "whole broadcasting", that is, share for the synchronization slot.

Operation setter 334 notifies connection controller 335 of the slot management information. Operation setter 334 outputs the slot management information to packet generator 333, and stores and reports the slot management information in the synchronization slot (see FIG. 3).

Connection controller 335 controls the network connector to connect or disconnect first communication network 120a and second communication network 120b, for each slot, in accordance with settings of share or unshare indicated by the received/transmitted slot management information.

That is, connection controller 335 determines whether or not the transmission source ID and the transmission destination ID of a data slot of a frame are set over first communication network 120a and second communication network 120b, for each data slot of the frame. Connection controller 335 operates transmission driver 327-1 and reception driver 322-1 in accordance with a communication direction, in a slot of which the transmission source ID and the transmission destination ID are set between communication networks 120. Connection controller 335 sets transmission driver 327-1 and reception driver 322-1 to be enabled in a slot of which the transmission source ID and the transmission destination ID are set without crossing between communication networks 120. In a case where the other intercom master device 300 sets reception driver 322-1 to be enabled in the same slot, connection controller 335 may set only reception driver 322-1 to be enabled.

With such a configuration, intercom master device 300 can assign different slots to first communication network 120a and second communication network 120b. Intercom master device 300 can control connection or disconnection with the other intercom master device 300, for each slot, in accordance with whether or not information is shared between first communication network 120a and second communication network 120b.

Configuration of Additional Monitor

Figure 6:
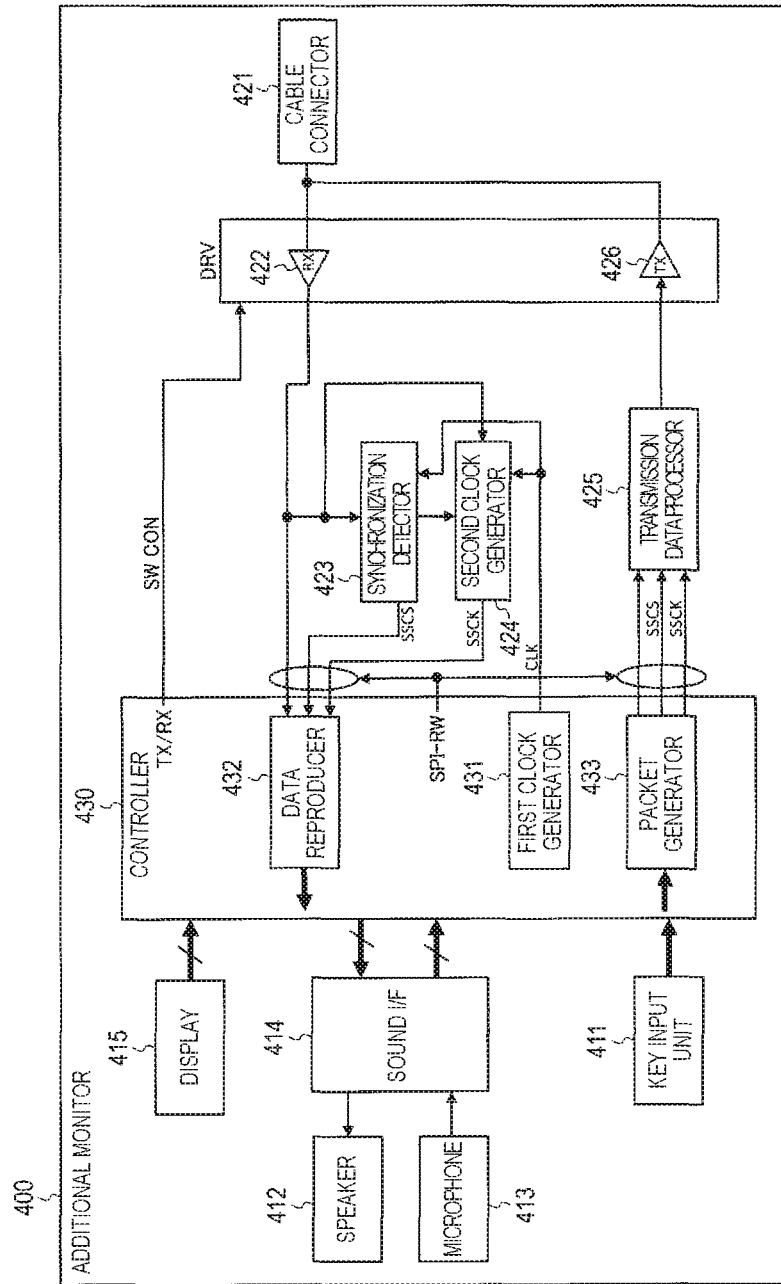
FIG. 6 is a block diagram illustrating an example of a configuration of an additional monitor in Exemplary Embodiment 1.

FIG. 6 is a block diagram illustrating an example of a configuration of additional monitor 400.

As illustrated in FIG. 6, additional monitor 400 includes key input unit 411, speaker 412, microphone 413, sound I/F 414, and display 415. Additional monitor 400 includes cable connector 421, reception driver 422, synchronization detector 423, second clock generator 424, transmission data processor 425, transmission driver 426, and controller 430. Controller 430 includes first clock generator 431, data reproducer 432, and packet generator 433 in the inside thereof.

Key input unit 411 includes a call button. When the call button is operated, key input unit 411 outputs a call signal indicating that the call button is operated, to controller 430.

Speaker 412 converts analog sound data output from sound I/F 414 into sound, and outputs the sound.

Microphone 413 collects sound of the vicinity thereof, converts the resultant of the collection into analog sound data, and outputs the analog sound data to sound I/F 414.

Sound I/F 414 converts digital sound data output from controller 430, into analog sound data. Sound I/F 414 adjusts a signal level, and outputs a signal having an adjusted signal level, to speaker 412. Sound I/F 414 adjusts a signal level of analog sound data output from microphone 413. Sound I/F 414 converts the analog sound data having the adjusted signal level into digital sound data, and outputs the digital sound data to controller 430. The analog-digital conversion is performed by an A/D converter and a D/A converter (not illustrated).

Predetermined sound compression processing is performed on data which is obtained by performing digital conversion of the analog sound data output from microphone 413. Sound I/F 414 may output data obtained by performing the sound compression processing, to controller 430 as digital sound data. In a case where digital sound data output from controller 430 is the data obtained by performing the predetermined sound compression processing, sound I/F 414 performs predetermined sound decompression processing on this digital sound data, and then performs digital-to-analog conversion.

Display 415 includes a liquid crystal display. Display 415 reproduces digital image data output from controller 430 and displays an image of the entrance. In a case where the digital image data output from controller 430 is data obtained by performing predetermined image compression processing, display 415 performs predetermined image decompression processing on this digital image data, and performs image display.

Cable connector 421 includes a connection terminal for communication cable 401 (see FIG. 1) which is a two-wire cable, and connects one end of communication cable 401 with reception driver 422 and transmission driver 426 in a state where a signal can be transmitted between the one end of communication cable 401, and reception driver 422 and transmission driver 426.

Reception driver 422 receives a downlink signal transmitted from intercom master device 300, through cable connector 421. Reception driver 422 outputs the downlink signal to synchronization detector 423, second clock generator 424, and transmission data processor 425 in a reception section of which an instruction is performed by a switching control signal (SW CON) from controller 430.

Synchronization detector 423 detects synchronization (the leading timing of each bit in reception data) with intercom master device 300 by using a clock (CLK) of a first frequency output from first clock generator 431, and by using preamble data included in the downlink signal which has been output from reception driver 422. Synchronization detector 423 outputs a triggering signal to second clock generator 424 and outputs an enable signal (SSCS) to data reproducer 432 at a timing when the unique pattern of the preamble data is detected. The triggering signal functions as a criterion for starting an output of the clock. The enable signal (SSCS) is used for permitting the data reproduction operation.

Second clock generator 424 generates a clock (SSCK) of a second frequency (for example, 4.8 MHz) which corresponds to the bit rate of the reception data, based on the clock (CLK) of the first frequency which has been output from first clock generator 431, at a timing of which an instruction is performed from synchronization detector 423. Second clock generator 424 sequentially outputs the generated clock to data reproducer 432.

If the enable signal (SSCS) is input from packet generator 433, transmission data processor 425 modulates data of an uplink packet output from packet generator 433 by using a clock (SSCK) of the second frequency output from packet generator 433. Thus, transmission data processor 425 generates an uplink signal. Transmission data processor 425 outputs the generated uplink signal to transmission driver 426.

Transmission driver 426 transmits the uplink signal to intercom master device 300 through cable connector 421 in a transmission section of which an instruction is performed by the switching control signal (SW CON) from controller 430.

Controller 430 controls the units of additional monitor 400. Controller 430 outputs a switching control signal (SW CON) to transmission driver 426 and reception driver 422. The switching control signal (SW CON) is used for an instruction of a transmission section in which transmission is permitted, and a reception section in which reception is permitted. Controller 430 transmits the call signal output from key input unit 411, to intercom master device 300.

First clock generator 431 of controller 430 generates a clock (CLK) of the first frequency (for example, 48 MHz (n=10)), which is a clock for sampling reception data. The first frequency corresponds to n times the bit rate of the reception data based on the crystal oscillation frequency. First clock generator 431 sequentially outputs the generated clock to synchronization detector 423 and second clock generator 424.

If the enable signal (SSCS) is input from synchronization detector 423, data reproducer 432 of controller 430 demodulates a downlink signal output from reception driver 422 by using a clock (SSCK) of the second frequency output from second clock generator 424. Thus, data reproducer 432 acquires slot management information and a downlink packet. Data reproducer 432 outputs digital image data included in the downlink packet, to display 415, and outputs digital sound data included in the downlink packet, to sound I/F 414.

Packet generator 433 of controller 430 generates an uplink packet for realizing a call with an image. Specifically, packet generator 433 appropriately splits digital sound data output from sound I/F 414. Packet generator 433 writes pieces of data obtained by the split, in user data field of slots, respectively. Packet generator 433 writes control data in the control data field of each slot. Packet generator 433 writes preamble data and a synchronization pattern in each slot, so as to generate an uplink packet (transmission data). Packet generator 433 generates an enable signal (SSCS) for transmission, and a clock (SSCK) of a second frequency (for example, 4.8 MHz) for transmission. Packet generator 433 synchronizes the uplink packet with the enable signal (SSCS) and the clock (SSCK) for the transmission, and outputs the uplink packet to transmission data processor 425.

As described above, controller 430 determines whether or not additional monitor 400 corresponds to a designated terminal for a certain frame, and operates additional monitor 400 in accordance with an use authority indicated by slot management information (see FIG. 3) of a frame in which additional monitor 400 is defined as a designated terminal. The determination is performed, for example, in such a manner that data reproducer 432 acquires (holds) a terminal ID of additional monitor 400, and determines whether or not the terminal ID is included in the transmission source ID of the designated-terminal transmission slot in the received synchronization slot.

Controller 430 specifies a reception section (reception slot) in which additional monitor 400 is required to perform reception, and a transmission section (transmission slot) in which additional monitor 400 is required to perform transmission, based on the slot management information. Controller 430 controls an output of the switching control signal (SW CON) and operations of data reproducer 432 and packet generator 433 so as to perform reception in the specified reception section, and to perform transmission in the specified transmission section.

With such a configuration, additional monitor 400 can transmit and receive various types of data in time division duplex, in accordance with slot management information of a frame in which additional monitor 400 is defined as a designated terminal.

Although not illustrated, each of entrance slave device 200, intercom master device 300, and additional monitor 400 includes, for example, a central processing unit (CPU), a storage medium such as a read only memory (ROM), in which a control program is stored, a work memory such as a random access memory (RAM), and a communication circuit. In this case, the CPU executes the control program, and thereby the above-described functions of the components are realized.

With the above-described configuration, intercom system 100 can appropriately switch connection or disconnection between first communication network 120a of first intercom system 110a and second communication network 120b of second intercom system 110b, in accordance with whether or not transmission is required.

Figure 7:
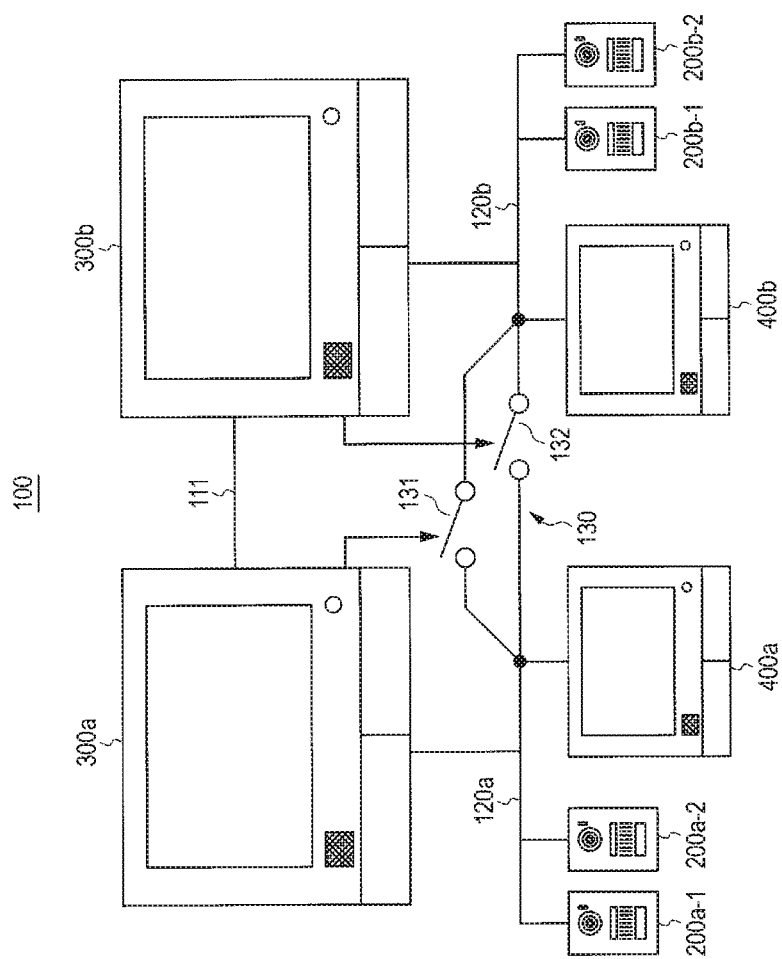
FIG. 7 is a conceptual diagram illustrating a network configuration of the intercom system according to Exemplary Embodiment 1.

FIG. 7 is a conceptual diagram illustrating a network configuration of intercom system 100.

As illustrated in FIG. 7, intercom system 100 includes first communication network 120a, second communication network 120b, and network connector 130 for connecting first communication network 120a and second communication network 120b. Each of communication networks 120 corresponds to cable connectors 321-2 to 321-N, reception drivers 322-2 to 322-N, transmission drivers 327-2 to 327-N, routing controller 323, and controller 330 in corresponding intercom master device 300. Network connector 130 corresponds to communication cable 111 (see FIG. 1), and cable connector 321-1, reception driver 322-1, and transmission driver 327-1 (see FIG. 5) of each intercom master device 300.

Cable connector 321 virtually includes switches 131 and 132 for switching connection or disconnection between first communication network 120a and second communication network 120b. Switch 131 corresponds to, for example, transmission driver 327-1 of first intercom master device 300a. Switch 132 corresponds to, for example, transmission driver 327-1 of second intercom master device 300b. That is, connection controller 335 of first intercom master device 300a and connection controller 335 of second intercom master device 300b (see FIG. 5) controls connection or disconnection between first communication network 120a and second communication network 120b.

Here, an example in which switch 131 corresponds to transmission driver 327-1 of first intercom master device 300a and switch 132 corresponds to transmission driver 327-1 of second intercom master device 300b is described. However, it is not limited to the details thereof. That is, switch 131 may correspond to reception driver 322-1 of first intercom master device 300a, or may correspond to both of transmission driver 327-1 and reception driver 322-1. Similarly, switch 132 may correspond to reception driver 322-1 of second intercom master device 300b, or may correspond to both of transmission driver 327-1 and reception driver 322-1.

Operation of Each Device

Next, an operation of each of the devices will be described.

Operation setter 334 illustrated in FIG. 5 may be provided only in one intercom master device 300, for example. That is, one intercom master device 300 may generate and transmit pieces of slot management information for all frames. Here, it is assumed that first intercom master device 300a is a device (referred to as "a main master device" below) which generates and transmits the slot management information, and second intercom master device 300b is a device (referred to as "a sub-master device" below) which does not generate and transmit the slot management information.

When viewed from each terminal, intercom system 110 or communication network 120 to which the terminal belongs is referred to as "the own household". Intercom system 110 or communication network 120 to which the terminal does not belong is referred to as "the other household". Further, when viewed from each terminal, this terminal is referred to as "the own terminal", and a terminal other than this terminal is referred to as "the other terminal".

Operation of Intercom Master Device

Firstly, an operation of intercom master device 300 will be described. Here, among operations of the intercom master device, an operation other than operations as a communication subject (terminal) for various types of data will be described.

Figure 8:
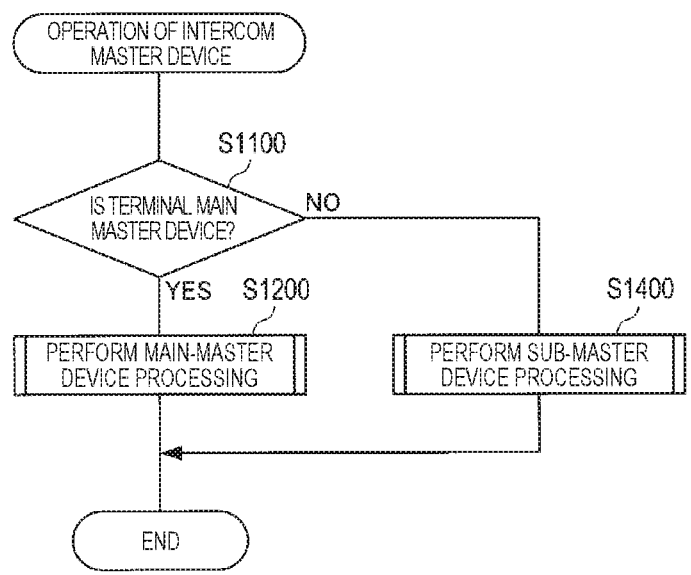
FIG. 8 is a flowchart illustrating an example of an operation of the intercom master device in Exemplary Embodiment 1.

FIG. 8 is a flowchart illustrating an example of an operation of intercom master device 300.

In Step S1100, controller 330 determines whether or not the own terminal is a main master device. In a case where the own terminal is a main master device (first intercom master device 300a in this exemplary embodiment) (S1100: YES), controller 330 causes the process to proceed to Step S1200. In a case where the own terminal is a sub-master device (second intercom master device 300b in this exemplary embodiment) (S1100: NO), controller 330 causes the process to proceed to Step S1400.

In Step S1200, controller 330 performs main-master device processing which is processing for controlling an operation of intercom system 100 as a main master device. Details of the main-master device processing will be described later.

In Step S1400, controller 330 performs sub-master device processing which is processing for receiving a control from the main master device and operating as a sub-master device. Details of the sub-master device processing will be described later.

In a case where intercom master device 300 is set or configured so as to operate only as a main master device or to operate only as a sub-master device, the determination processing may be omitted.

Figure 9:
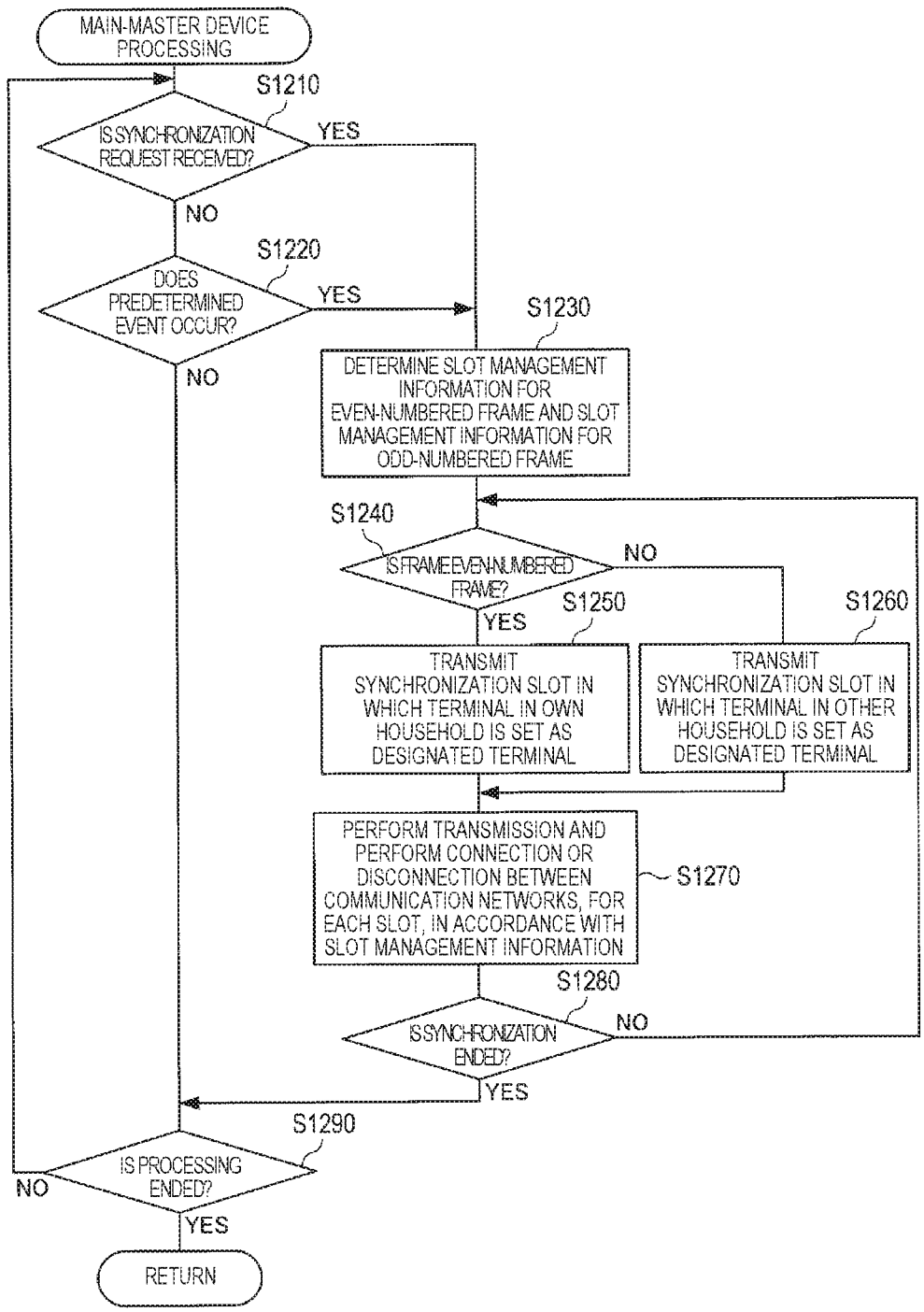
FIG. 9 is a flowchart illustrating an example of main-master device processing in Exemplary Embodiment 1.

FIG. 9 is a flowchart illustrating an example of the main-master device processing.

In Step S1210, operation setter 334 determines whether or not a synchronization request is received from the sub-master device or a terminal in the own household, based on information which has been reproduced from a reception signal by data reproducer 332. In a case where the synchronization request is received (S1210: YES), operation setter 334 causes the process to proceed to Step S1230 which will be described later. In a case where the synchronization request is not received (S1210: NO), operation setter 334 causes the process to proceed to Step S1220.

In Step S1220, operation setter 334 determines whether or not a predetermined event occurs, based on information which has been reproduced from the reception signal by data reproducer 332. The predetermined event means, for example, reception of the call signal from entrance slave device 200 of the own household after synchronization is established. In a case where the predetermined event occurs (S1220: YES), operation setter 334 causes the process to proceed to Step S1230. In a case where the predetermined event does not occur (S1220: NO), operation setter 334 causes the process to proceed to Step S1290 which will be described later.

In Step S1230, operation setter 334 determines slot management information for an even-numbered frame (that is, for the own household), and slot management information for an odd-numbered frame (that is, for the other household). Operation setter 334 causes the process to proceed to Step S1240. At this time, in a case where a notification of whether in-household communication is performed or whole-household communication is performed in each slot is received from the sub-master device, operation setter 334 determines slot management information based on details of the notification. In a case where the predetermined event occurs, operation setter 334 determines slot management information in accordance with the (type of) event.

In Step S1240, packet generator 333 determines whether or not it is a timing of an even-numbered frame among even-numbered frames and odd-numbered frames. In a case where it is a timing of an even-numbered frame (S1240: YES), packet generator 333 causes the process to proceed to Step S1250. In a case where it is a timing of an odd-numbered frame (S1240: NO), packet generator 333 causes the process to proceed to Step S1260 which will be described later.

In Step S1250, packet generator 333 transmits a synchronization slot in which a terminal in the own household (that is, in first communication network 120a) is set as a designated terminal, and causes the process to proceed to Step S1270 which will be described later.

In Step S1260, packet generator 333 transmits a synchronization slot in which a terminal in the other household (that is, in second communication network 120b) is set as a designated terminal, and causes the process to proceed to Step S1270.

In Step S1270, controller 330 controls the units to perform transmission processing (routing), in accordance with the slot management information of the transmitted synchronization slot. The control is performed until the last of the current frame. At this time, connection controller 335 of controller 330 controls connection or disconnection between first communication network 120a and second communication network 120b, for each data slot.

In Step S1280, controller 330 determines whether or not synchronization of communication in intercom system 100 is ended. For example, when a control signal indicating an end of communication is received from any terminal, controller 330 determines that synchronization of the communication is ended. In a case where the synchronization is not ended (S1280: NO), controller 330 causes the process to return to Step S1240. In a case where the synchronization is ended (S1280: YES), controller 330 causes the process to proceed to Step S1290.

In Step S1290, controller 330 determines whether an instruction to end the main-master device processing is performed by a user operation and the like. In a case where the instruction to end the main-master device processing is not performed (S1290: NO), controller 330 causes the process to return to Step S1210. In a case where the instruction to end the main-master device processing is performed (S1290: YES), controller 330 ends a series of processes. The end of the processing corresponds, for example, a case where an operation of power OFF is performed.

With such an operation, the main master device can control an operation of intercom system 100.

Figure 10:
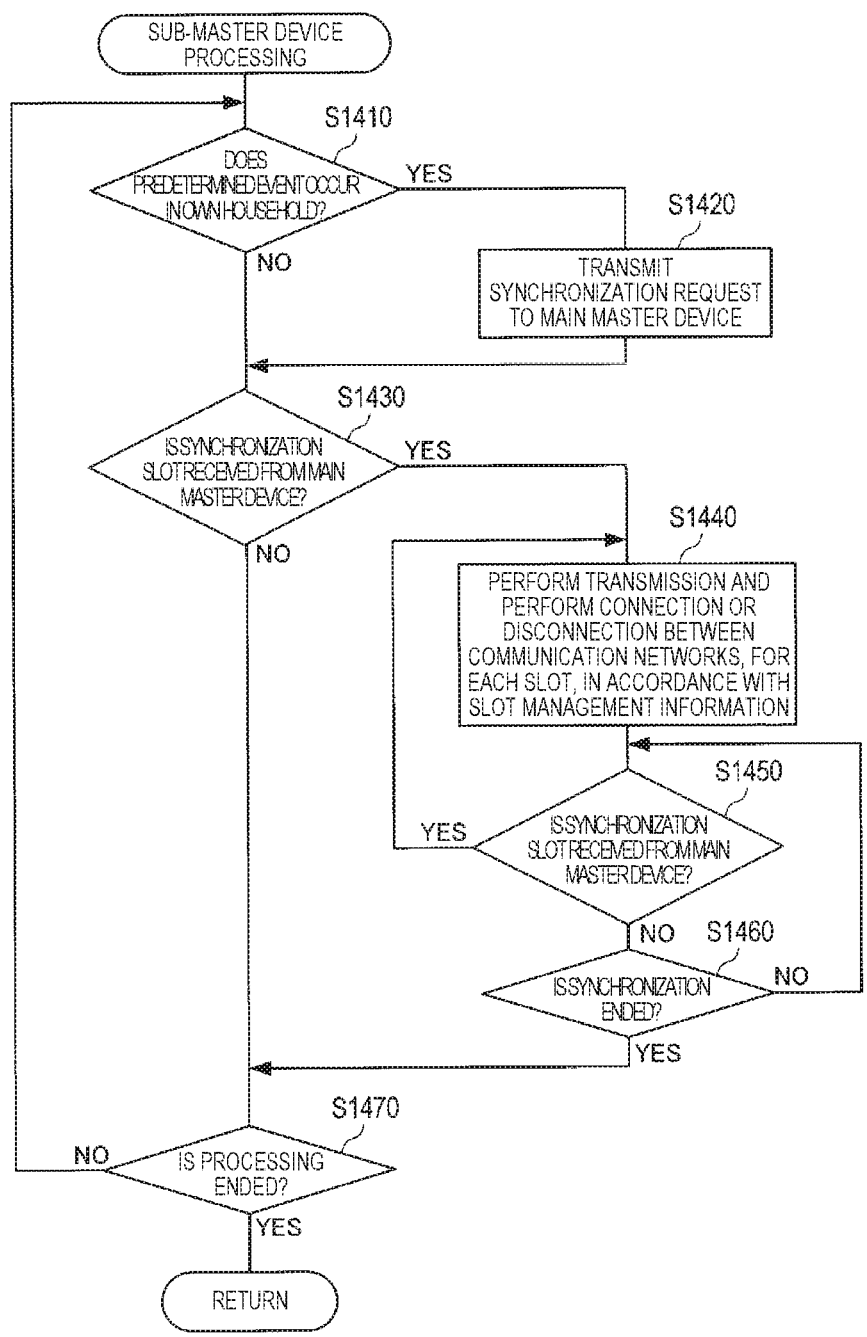
FIG. 10 is a flowchart illustrating an example of sub-master device processing in Exemplary Embodiment 1.

FIG. 10 is a flowchart illustrating an example of the sub-master device processing.

In Step S1410, operation setter 334 determines whether or not a predetermined event occurs in the own household, based on information which has been reproduced from a reception signal by data reproducer 332. The predetermined event means, for example, reception of the call signal from entrance slave device 200 in the own household. In a case where the predetermined event occurs in the own household (S1410: YES), operation setter 334 causes the process to proceed to Step S1420. In a case where the predetermined event does not occur in the own household (S1410: NO), operation setter 334 causes the process to proceed to Step S1430 which will be described later.

In Step S1420, operation setter 334 transmits a synchronization request to the main master device, and causes the process to proceed to Step S1430. The transmission is performed, for example, by using packet generator 333. At this time, operation setter 334 performs a notification of whether in-household communication is performed or whole-household communication is performed in each slot, and negotiates settings of share or unshare of each slot between operation setter 334 and the main master device.

In Step S1430, operation setter 334 determines whether or not a synchronization slot is received from the main master device, based on information which has been reproduced from a reception signal by data reproducer 332. In a case where the synchronization slot is received from the main master device (S1430: YES), operation setter 334 causes the process to proceed to Step S1440. In a case where the synchronization slot is not received from the main master device (S1430: NO), operation setter 334 causes the process to proceed to Step S1470 which will be described later.

In Step S1440, controller 330 controls the units to perform transmission processing (routing), in accordance with slot management information of the received synchronization slot. The control is performed until the last of the current frame. At this time, connection controller 335 of controller 330 controls connection or disconnection between first communication network 120a and second communication network 120b, for each data slot.

In Step S1450, similarly to Step S1430, operation setter 334 determines whether or not the synchronization slot is received from the main master device. In a case where the synchronization slot is received from the main master device (S1450: YES), operation setter 334 causes the process to return to Step S1440. In a case where the synchronization slot is not received from the main master device (S1450: NO), operation setter 334 causes the process to proceed to Step S1460.

In Step S1460, controller 330 determines whether or not synchronization of communication in intercom system 100 is ended. For example, when a control signal indicating an end of communication is received from any terminal, controller 330 determines that synchronization of the communication is ended. In a case where the synchronization is not ended (S1460: NO), controller 330 causes the process to return to Step S1450. In a case where the synchronization is ended (S1460: YES), controller 330 causes the process to proceed to Step S1470.

In Step S1470, controller 330 determines whether an instruction to end the sub-master device processing is performed by a user operation and the like. In a case where the instruction to end the sub-master device processing is not performed (S1470: NO), controller 330 causes the process to return to Step S1410. In a case where the instruction to end the sub-master device processing is performed (S1470: YES), controller 330 ends a series of processes. The end of the processing corresponds, for example, a case where an operation of power OFF is performed.

With such an operation, the sub-master device can receive a control from the main master device, and operate.

Operation of Each Terminal

Next, an operation of each of entrance slave device 200, intercom master device 300, and additional monitor, as a communication subject for various types of data will be described. Each of the terminals performs terminal communication processing for realizing an operation as a communication subject for various types of data.

Figure 11:
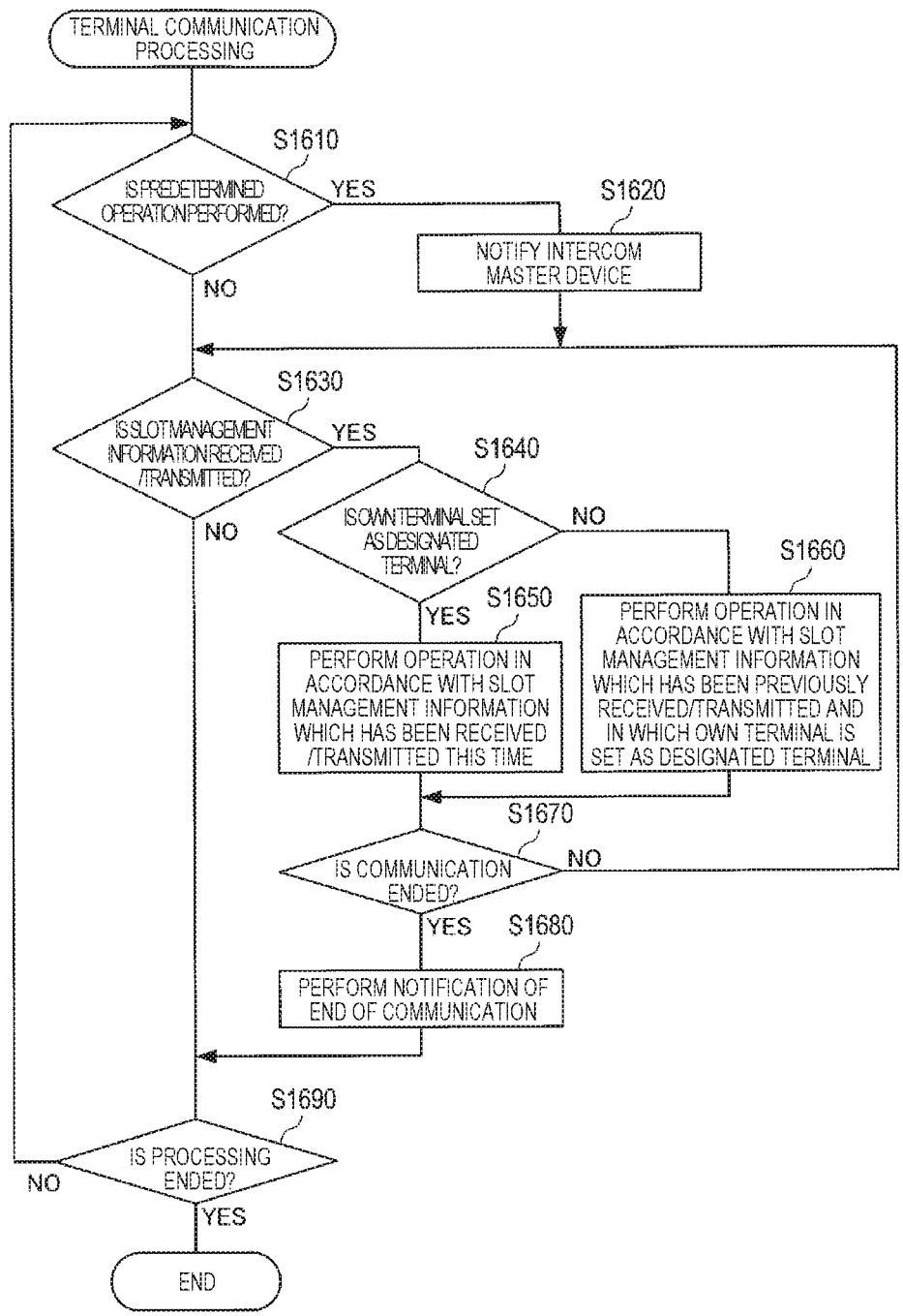
FIG. 11 is a flowchart illustrating an example of terminal communication processing in Exemplary Embodiment 1.

FIG. 11 is a flowchart illustrating an example of the terminal communication processing.

In Step S1610, the controller (230, 330, or 430) of the terminal determine whether or not a predetermined operation such as a call operation or a response operation is performed in the terminal. In a case where the predetermined operation is performed (S1610: YES), the controller causes the process to return to Step S1620. In a case where the predetermined operation is not performed (S1610: NO), the controller causes the process to proceed to Step S1630 which will be described later.

In Step S1620, the controller transmits a control signal so as to notify intercom master device 300 in the own household that the predetermined operation is performed. The controller causes the process to proceed to Step S1630. In a case where the terminal is intercom master device 300, the above transmission is not required.

In Step S1630, the controller determines whether or not a synchronization slot of a frame is received or transmitted, that is, determines whether or not slot management information is received or transmitted. In a case where the slot management information is received or transmitted (S1630: YES), the controller causes the process to proceed to Step S1640. In a case where the slot management information is not received or transmitted (S1630: NO), the controller causes the process to proceed to Step S1690 which will be described later.

In Step S1640, the controller determines whether or not the own terminal is set as a designated terminal in the frame which is received or transmitted this time. That is, the controller determines whether or not any transmission source ID of designated-terminal transmission slot, which is written in the slot management information coincides with the terminal ID of the own terminal. In a case where the own terminal is set as the designated terminal in the frame (S1640: YES), the controller causes the process to proceed to Step S1650. In a case where the own terminal is not set as the designated terminal in the frame (S1640: NO), the controller causes the process to proceed to Step S1660 which will be described later.

In Step S1650, the controller performs an operation corresponding to one frame, in accordance with the slot management information which has been received or transmitted this time. The controller causes the process to proceed to Step S1670 which will be described later. That is, the controller transmits data in a slot in which the own terminal is set as a transmission source, and receives data in a slot in which the own terminal is set as a transmission destination. The controller holds (stores) details of the slot management information which has been received or transmitted this time, in a memory and the like even after the operation corresponding to one frame is ended.

In Step S1660, the controller performs an operation corresponding to one frame, in accordance with slot management information of a frame in which the own terminal is set as a designated terminal among frames which have been previously received or transmitted. The controller causes the process to proceed to Step S1670. In a case where the frame is not received or transmitted, the controller causes the process to proceed to Step S1670 as it is.

In Step S1670, for example, if a user performs a call end operation, controller 330 determines whether or not an instruction to end communication processing is performed. In a case where the instruction to end the processing is not performed (S1670: NO), the controller causes the process to return to Step S1630 so as to transition to processing for the next frame. In a case where the instruction to end the processing is performed (S1670: YES), controller 330 causes the process to proceed to Step S1680.

In Step S1680, the controller, for example, transmits a control signal so as to notify each intercom master device 300 of an end of communication.

In Step S1690, the controller determines whether an instruction to end the terminal communication processing is performed by a user operation and the like. In a case where the instruction to end the terminal communication processing is not performed (S1690: NO), the controller causes the process to return to Step S1610. In a case where the instruction to end the terminal communication processing is performed (S1690: YES), the controller ends a series of processes.

With such an operation, each terminal can operate in accordance with slot management information of a frame in which the own terminal is set as a designated terminal, among pieces of slot management information transmitted from the main master device.

Operation of Intercom System

Lastly, an operation of intercom system 100 will be described.

Figure 12:
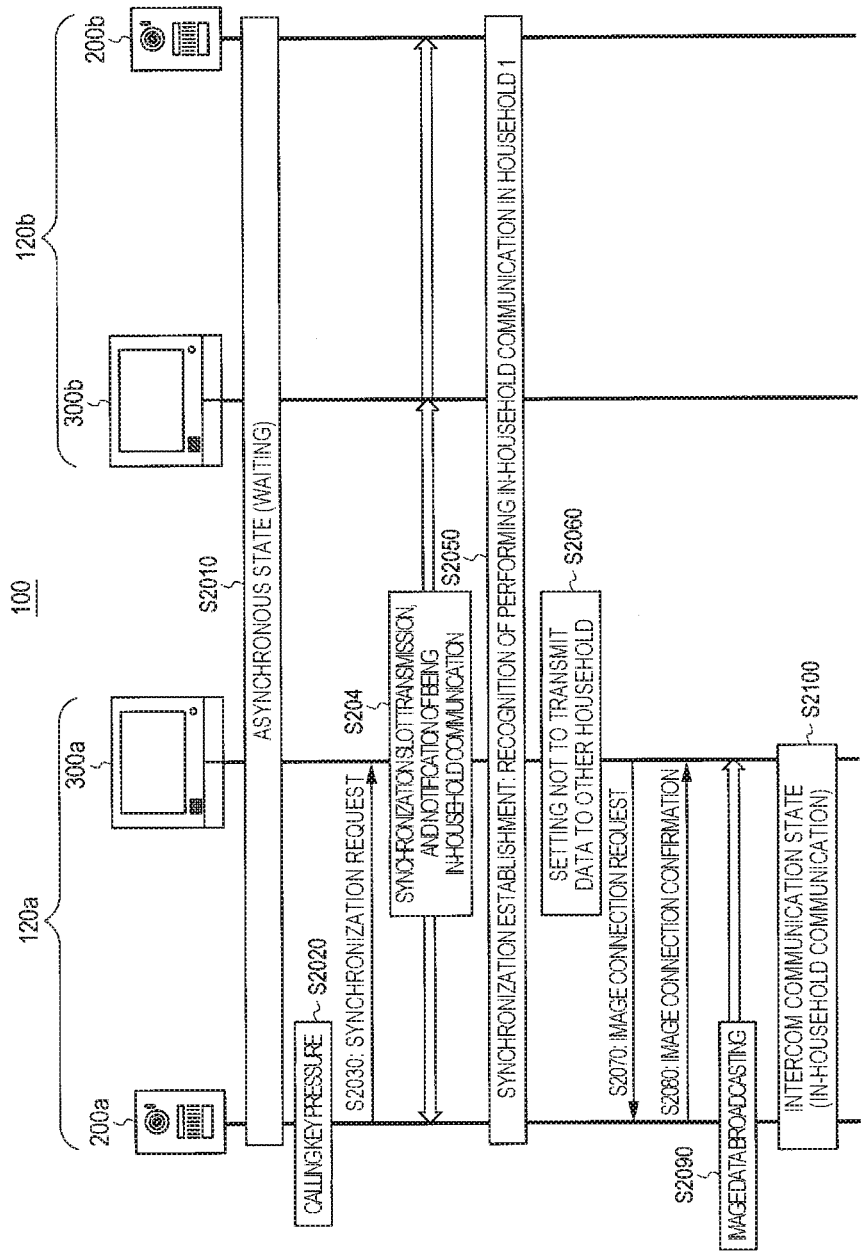
FIG. 12 is a sequence diagram illustrating an example of an operation in a case where data is not shared in the intercom system according to Exemplary Embodiment 1.

FIG. 12 is a sequence diagram illustrating an example of the operation of intercom system 100 in a case where details that information transmitted through the first communication network is not shared with the second communication network when a call operation is performed in any first entrance slave device 200a are set. Illustrations and descriptions for some terminals will be omitted.

In an asynchronous state (event waiting state) (S2010), if an operation of the call button is performed (calling key is pressed) in first entrance slave device 200a (S2020), first entrance slave device 200a transmits the call signal, that is, a synchronization request to first intercom master device 300a (S2030). If the synchronization request is transmitted, first intercom master device 300a transmits a synchronization slot (slot management information) having details in which information of each data slot is not shared between first communication network 120a and second communication network 120b. Thus, first intercom master device 300a notifies each terminal of being in-household communication (transmission only in the own household) (S2040). As a result, synchronization between first communication network 120a and second communication network 120b is established, and each of first intercom master device 300a and second intercom master device 300b recognizes that in-household communication is performed in Household 1 (first communication network 120a) (S2050).

First intercom master device 300a performs setting so as not to transmit data to the other household (S2060), and transmits an image connection request to first entrance slave device 200a (S2070). That is, first intercom master device 300a sets transmission driver 327-1 which performs transmission to second intercom master device 300b, to be enabled in a data slot.

First entrance slave device 200a transmits image connection confirmation as a response (S2080), and broadcasts image data (image data) (S2090). The image data is not transmitted to the other household (second communication network 120b). In first communication network 120a including first entrance slave device 200a and first intercom master device 300a, an intercom communication state (in-household communication) closed in first communication network 120a is started (S2100).

Figure 13:
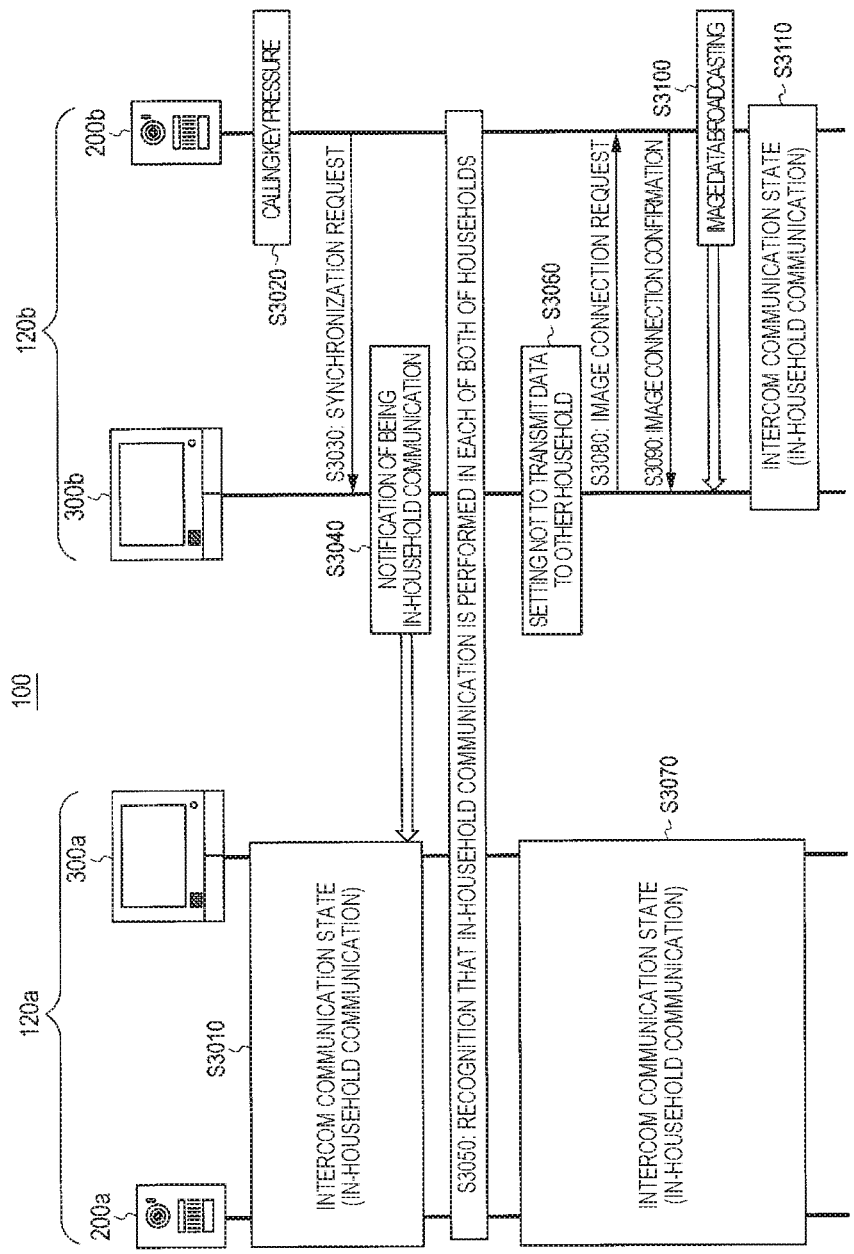
FIG. 13 is a diagram illustrating an example of the operation subsequent to that in FIG. 12, in the intercom system according to Exemplary Embodiment 1.

FIG. 13 is a sequence diagram illustrating an example of the operation of intercom system 100 in a case where a call operation is performed in any second entrance slave device 200b after the intercom communication state (in-household communication) closed in first communication network 120a is started, as illustrated in FIG. 12.

When the intercom communication state (in-household communication) closed in first communication network 120a (S3010), it is assumed that an operation of the call button (pressing of a calling key) is performed in second entrance slave device 200b (S3020). If the operation of the call button is performed, second entrance slave device 200b transmits the call signal, that is, a synchronization request to second intercom master device 300b (S3030). If the synchronization request is transmitted, second intercom master device 300b notifies first intercom master device 300a that an intercom communication state (in-household communication) closed in second communication network 120b including second entrance slave device 200b and second intercom master device 300b is started (S3040). The notification is performed, for example, by using a designated-terminal transmission slot which has been assigned to second intercom master device 300b.

As a result, first intercom master device 300a and second intercom master device 300b recognize that each of first intercom master device 300a and second intercom master device 300b performs in-household communication (S3050). In first communication network 120a, the intercom communication state (in-household communication) closed in first communication network 120a continues (S3070). Second intercom master device 300b performs setting so as not to transmit data to the other household (S3060), and transmits an image connection request to second entrance slave device 200b (S3080). That is, second intercom master device 300b sets transmission driver 327-1 which performs transmission to first intercom master device 300a, to be enabled in a data slot.

Second entrance slave device 200b transmits image connection confirmation as a response (S3090), and broadcasts image data (S3100). The image data is not transmitted to the other household (first communication network 120a). In second communication network 120b including second entrance slave device 200b and second intercom master device 300b, the intercom communication state (in-household communication) closed in second communication network 120b is started (S3110).

Figure 14:
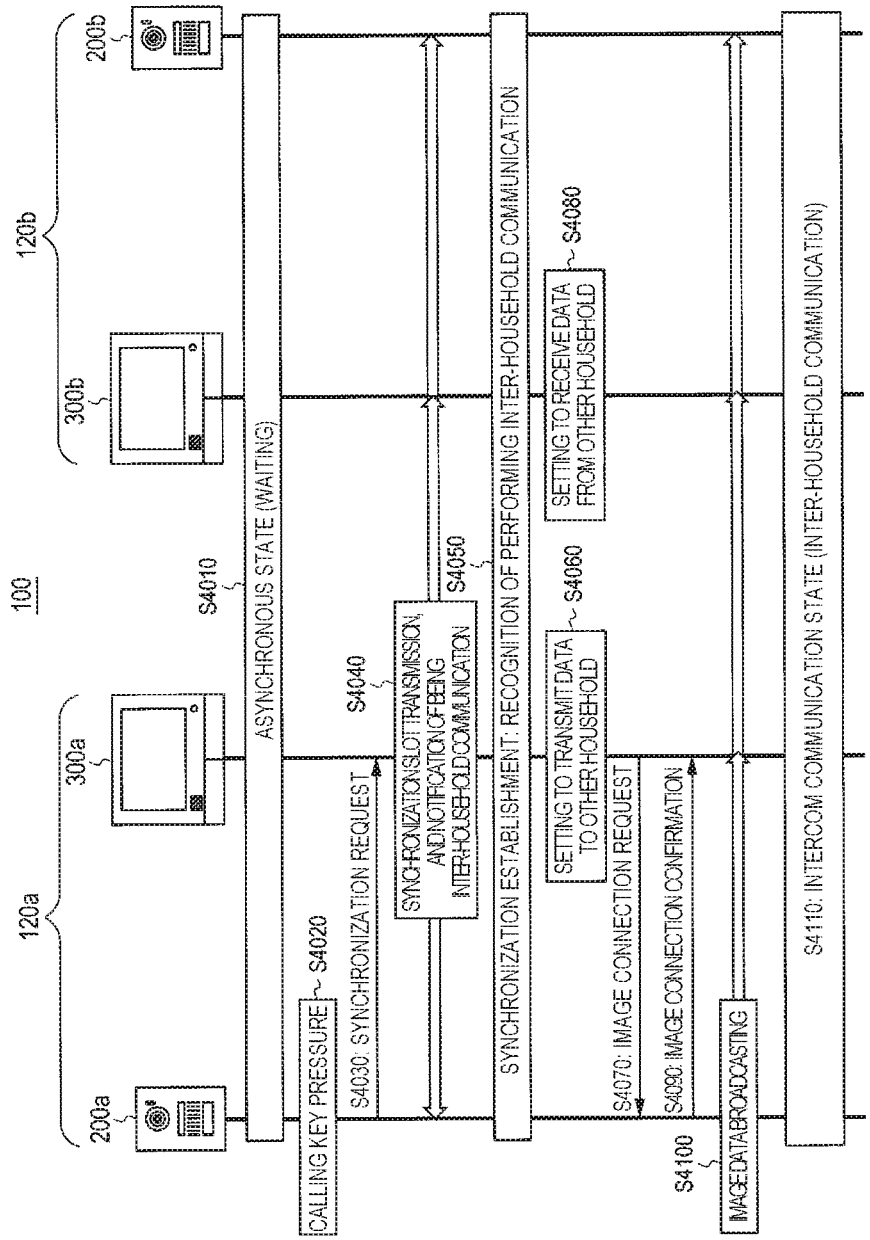
FIG. 14 is a sequence diagram illustrating an example of an operation in a case where data is shared in the intercom system according to Exemplary Embodiment 1.

FIG. 14 is a sequence diagram illustrating an example of the operation of intercom system 100 in a case where details that information transmitted through first communication network is shared with the second communication network are set when the call operation is performed in any first entrance slave device 200a. Illustrations and descriptions for some terminals will be omitted.

In an asynchronous state (event waiting state) (S4010), if an operation of the call button is performed (calling key is pressed) in first entrance slave device 200a (S4020), first entrance slave device 200a transmits the call signal, that is, a synchronization request to first intercom master device 300a (S4030). If the synchronization request is transmitted, first intercom master device 300a transmits a synchronization slot (slot management information) having details in which information of each data slot is shared between first communication network 120a and second communication network 120b. Thus, first intercom master device 300a notifies each terminal of being inter-household communication (transmission in both of the systems) (S4040). Synchronization between first communication network 120a and second communication network 120b is established. First intercom master device 300a and second intercom master device 300b recognize that inter-household communication is performed (that transmission or reception data is shared) (S4050).

First intercom master device 300a performs setting so as to also transmit data to the other household (S4060), and transmits an image connection request to first entrance slave device 200a (S4070). That is, first intercom master device 300a operates transmission driver 327-1 which performs transmission to second intercom master device 300b, in a data slot, similarly to other transmission drivers 327-2 to 327-N. Second intercom master device 300b is set so as to received data from the other household (S4080).

First entrance slave device 200a transmits image connection confirmation as a response (S4090), and broadcasts image data (S4100). The image data is also transmitted to the other household (second communication network 120b), and thus, for example, an image of the vicinity of first entrance slave device 200a is displayed in second intercom master device 300b. An intercom communication state (inter-household communication) is started in all of first communication network 120a and second communication network 120b (S4110).

With such an operation, intercom system 100 can realize both of in-household communication and inter-household communication.

Advantages of this Exemplary Embodiment

As described above, intercom system 100 according to this exemplary embodiment includes first communication network 120a which includes first entrance slave device 200a and first intercom master device 300a, and second communication network 120b which includes second entrance slave device 200b and second intercom master device 300b. First communication network 120a and second communication network 120b are communication networks in which communication is performed by time division duplex. Intercom system 100 includes network connector 130 for connecting first communication network 120a and second communication network 120b, for each slot. Intercom system 100 includes operation setter 334 which sets share or unshare indicating whether or not information stored in a slot is shared between first communication network 120a and second communication network 120b, for each slot. Further, intercom system 100 includes connection controller 335 which controls network connector 130 to perform connection or disconnection between first communication network 120a and second communication network 120b, in accordance with settings of the share or the unshare.

Thus, intercom system 100 according to this exemplary embodiment can suppress unnecessary consumption of communication resources, and share information between first communication network 120a and second communication network 120b. Accordingly, it is possible to achieve improvement of convenience in being used in a plurality of households.

In intercom system 100 according to this exemplary embodiment, each of first communication network 120a and second communication network 120b performs communication by using a frame which includes a synchronization slot at the leading. Operation setter 334 sets share for at least the synchronization slot.

Thus, intercom system 100 according to this exemplary embodiment can obtain synchronization of communication in all terminals in first communication network 120a and second communication network 120b.

In intercom system 100 according to this exemplary embodiment, each of first communication network 120a and second communication network 120b performs communication by using a frame which includes a plurality of data slots for storing data. Operation setter 334 transmits a synchronization slot to each of a plurality of terminals in first communication network 120a and to each of a plurality of terminals in second communication network 120b. The synchronization slot stores slot management information which indicates settings and an use authority of share or unshare for each slot of the frame, and a designated terminal which is a terminal required to follow the use authority. When the terminal corresponds to a designated terminal for the first frame, the terminal operates in accordance with the use authority of the first frame in the first frame. When the terminal does not correspond to the designated terminal for the first frame, but corresponds to a designated terminal of a second frame which has been previously received, the terminal operates in accordance with the use authority of the second frame in the first frame.

Thus, intercom system 100 according to this exemplary embodiment can (simultaneously) perform communication having different details, in first communication network 120a and second communication network 120b, by using the same slot.

Modification Example of this Exemplary Embodiment

The communication scheme of each of the communication networks is not limited to the above-described example. For example, each terminal may be connected by using a local area network (LAN) cable, and perform time division duplex.

The number or the positions of terminals in each of communication networks 120, and the number of communication networks 120 to which the terminal is connected are not limited to the above-described example. For example, one entrance slave device 200 and one intercom master device 300 may be provided in each intercom system. Intercom system 110 for households of which the number is equal or more than 3 may be connected.

A device portion for exhibiting the functions of network connector 130, operation setter 334, and connection controller 335 may be not necessarily disposed in intercom master device 300. For example, theses device portions may be provided in another device disposed on communication cable 111 which connects first intercom master device 300a and second intercom master device 300b.

The timing when a terminal functioning as a target of slot management information is switched (between first communication network 120a and second communication network 120b) is not limited to the above-described example. For example, operation setter 334 may perform switching between a synchronization slot in which each of a plurality of terminals in first communication network 120a is set as a designated terminal, and a synchronization slot in which each of a plurality of terminals in second communication network 120*b* is set as a designated terminal, for each of a plurality of frames. Operation setter 334 may transmit the switched synchronization slot. The transmission interval may be different between first communication network 120*a* and second communication network 120*b*.

In each of the terminals, the method of determining a piece of slot management information to be followed for performing an operation is not limited to the above-described example. For example, each of the terminals may determine a piece of slot management information to be followed for performing an operation, for each frame, based on information which varies depending on a frame number, a time, and a period.

A portion of the configuration of each of the above-described devices may be physically separate from other portions of the configuration of the device. In this case, the configuration is required to include a communicator for performing communication between the portions which are separate from each other.

Exemplary Embodiment 2

Exemplary Embodiment 2 is an example in which any of a plurality of intercom master devices can control the operation of the intercom system.

Configurations of an intercom system and each device according to this exemplary embodiment are similar to those in Exemplary Embodiment 1. Thus, illustrations and descriptions thereof will be omitted. However, an operation of each intercom master device 300 according to this exemplary embodiment is different from that in Exemplary Embodiment 1. Specifically, both of first intercom master device 300*a* and second intercom master device 300*b* generate and transmit slot management information. In this exemplary embodiment, regardless of whether or not the slot management information is transmitted, appropriately, first intercom master device 300*a* is referred to as "the main master device", and second intercom master device 300*b* is referred to as "the sub-master device".

Figure 15:
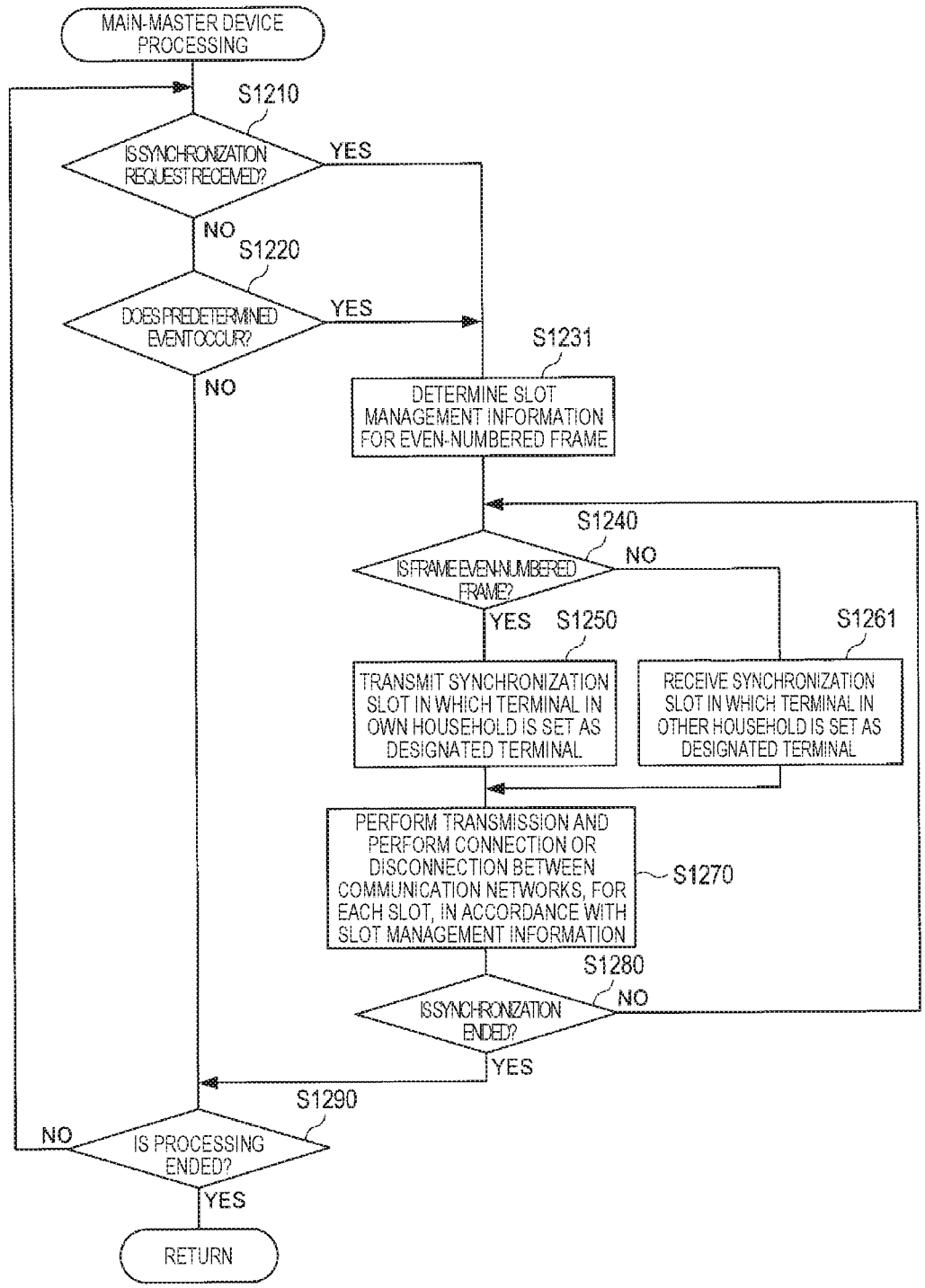
FIG. 15 is a flowchart illustrating an example of main-master device processing according to Exemplary Embodiment 2 of the present disclosure.

FIG. 15 is a flowchart illustrating an example of main-master device processing in this exemplary embodiment. FIG. 15 corresponds to FIG. 9 in Exemplary Embodiment 1. Components which are the same as those in FIG. 9 are denoted by the same step numbers, and descriptions thereof will be omitted.

In a case where a synchronization request is received (S1210: YES), or in a case where a predetermined event occurs (S1220: YES), operation setter 334 causes the process to proceed to Step S1231.

In Step S1231, operation setter 334 determines only slot management information for an even-numbered frame (that is, for the own household), and causes the process to proceed to Step S1240.

In a case where it is a timing of an odd-numbered frame (S1240: NO), packet generator 333 causes the process to proceed to Step S1261.

In Step S1261, a synchronization slot in which a terminal in the other household (that is, in second communication network 120*b*) is set as a designated terminal is received from the slave terminal, and the process proceeds to Step S1270.

With such an operation, the main master device can control an operation of intercom system 100 in an even-numbered frame, and can receive a control from the sub-master device and operate in an odd-numbered frame.

Figure 16:
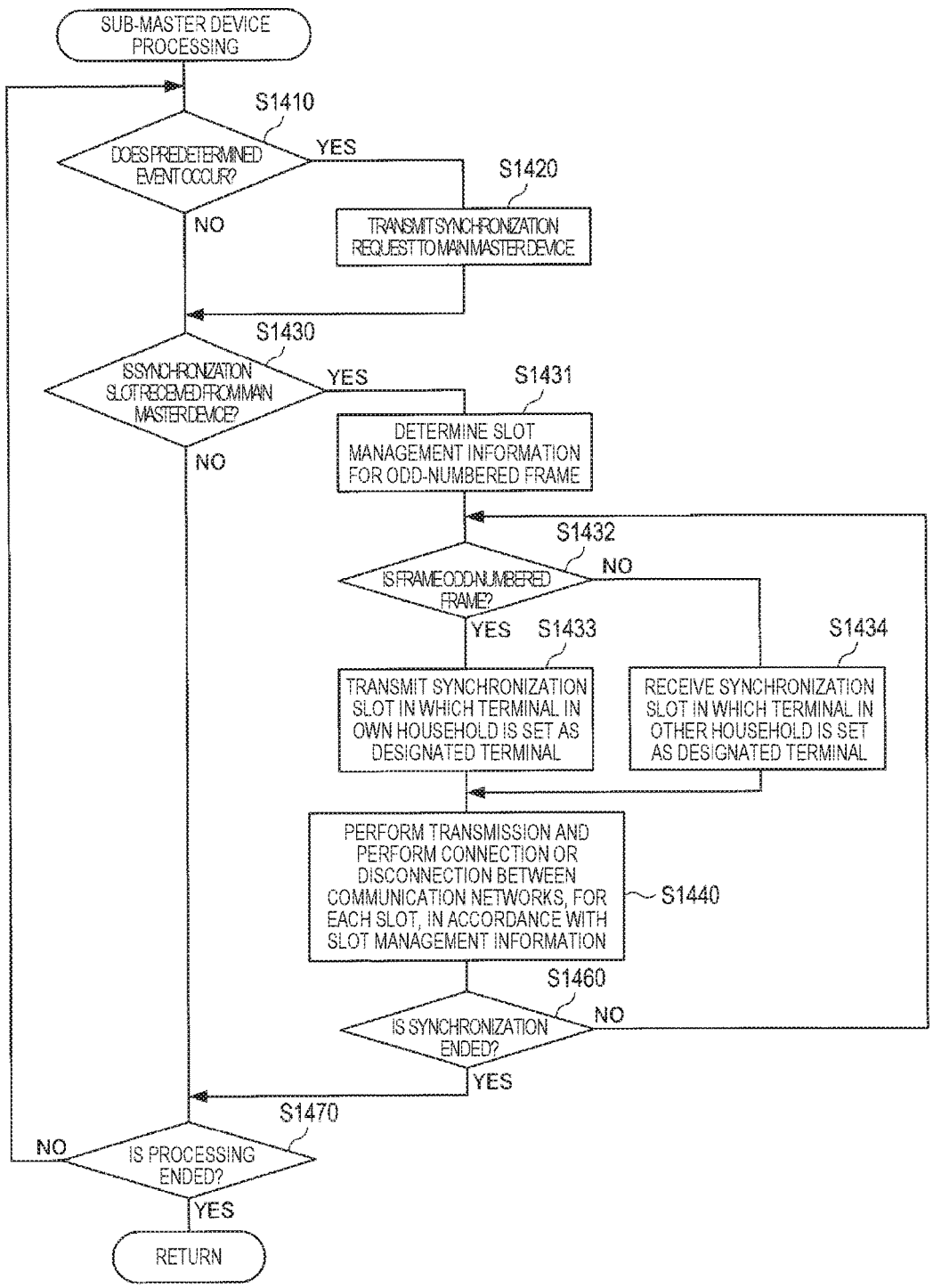
FIG. 16 is a flowchart illustrating an example of sub-master device processing in Exemplary Embodiment 2.

FIG. 16 is a flowchart illustrating an example of sub-master device processing in this exemplary embodiment. FIG. 16 corresponds to FIG. 10 in Exemplary Embodiment 1. Components which are the same as those in FIG. 10 are denoted by the same step numbers, and descriptions thereof will be omitted.

In a case where a synchronization slot is received from the main master device (S1430: YES), operation setter 334 causes the process to proceed to Step S1431.

In Step S1431, operation setter 334 determines slot management information for an odd-numbered frame (that is, for the own household).

In Step S1432, packet generator 333 determines whether or not it is a timing of an odd-numbered frame among even-numbered frames and odd-numbered frames. In a case where it is the timing of an odd-numbered frame (S1432: YES), packet generator 333 causes the process to proceed to Step S1433. In a case where it is the timing of an even-numbered frame (S1432: NO), packet generator 333 causes the process to proceed to Step S1434 which will be described later.

In Step S1433, packet generator 333 transmits a synchronization slot in which a terminal in the own household (that is, in second communication network 120*b*) is set as a designated terminal, and causes the process to proceed to Step S1440.

In Step S1434, packet generator 333 transmits a synchronization slot in which a terminal in the other household (that is, in first communication network 120*a*) is set as a designated terminal, and causes the process to proceed to Step S1440.

With such an operation, the sub-master device can operate under a control of the main master device in an even-numbered frame, and can control an operation of intercom system 100 in an odd-number frame.

Figure 17:
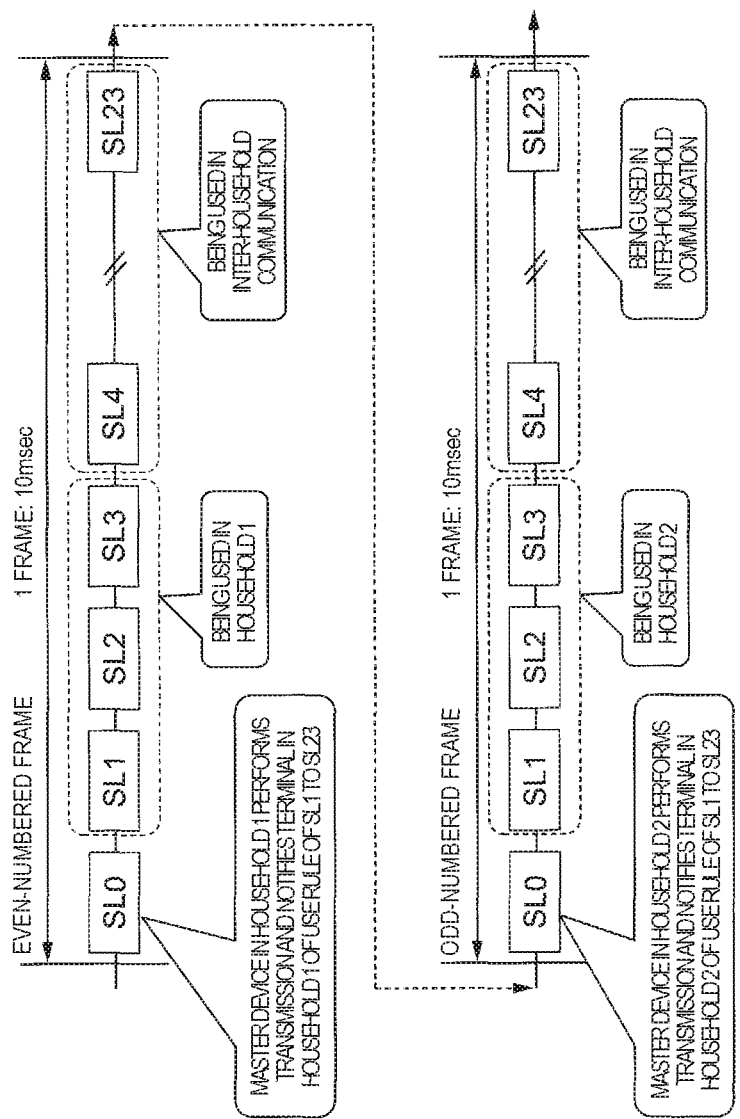
FIG. 17 is a schematic diagram illustrating an example of a function of each slot in Exemplary Embodiment 2.

FIG. 17 is a schematic diagram illustrating an example of the function of each slot.

As illustrated in FIG. 17, the synchronization slot (SL0) of an even-numbered frame is used when slot management information of a master device (first intercom master device 300*a*) in Household 1 is transmitted. The transmission causes each of terminals in Household 1 (first communication network 120*a*) to be notified of a use rule for the first to the 23rd slots (SL1 to SL23).

For example, regarding slot management information transmitted in the even-numbered frame, it is defined that the first to the third slots (SL1 to SL3) are used only in Household 1, and the fourth to the 23rd slots (SL4 to SL23) are commonly used in both of the households (first and second communication networks 120*a* and 120*b*). In the slot management information transmitted in the even-numbered frame, similarly to Exemplary Embodiment 1, each of terminals in first communication network 120*a* is set as a designated terminal. Accordingly, each of the terminals in first communication network 120*a* operates in accordance with the slot management information transmitted in the even-numbered frame, in both of an even-numbered frame and an odd-numbered frame.

For example, regarding slot management information transmitted in an odd-numbered frame, it is defined that the first to the third slots (SL1 to SL3) are used only in Household 2, and the fourth to the 23rd slots (SL4 to SL23) are commonly used in both of the households (first and second communication networks 120*a* and 120*b*). In the slot management information transmitted in the odd-numbered frame, similarly to Exemplary Embodiment 1, each of terminals in second communication network 120*b* is set as a designated terminal. Accordingly, each of the terminals in second communication network 120b operates in accordance with the slot management information transmitted in the odd-numbered frame, in both of an even-numbered frame and an odd-numbered frame.

As described above, intercom system 100 can set share or unshare in a unit of a slot in one frame. Such setting can be also performed in Exemplary Embodiment 1. The method of setting share or unshare is not limited to the above example.

It is also considered that a slot used when first intercom master device 300a transmits the slot management information, and a slot used when second intercom master device 300b transmits the slot management information are set in one frame. However, in this case, two slots in one frame are used in transmitting the slot management information. Thus, as in this exemplary embodiment, the function of a synchronization slot is switched in a unit of a frame, and thus it is possible to prevent reduction of resources which are usable in data transmission.

Figure 18:
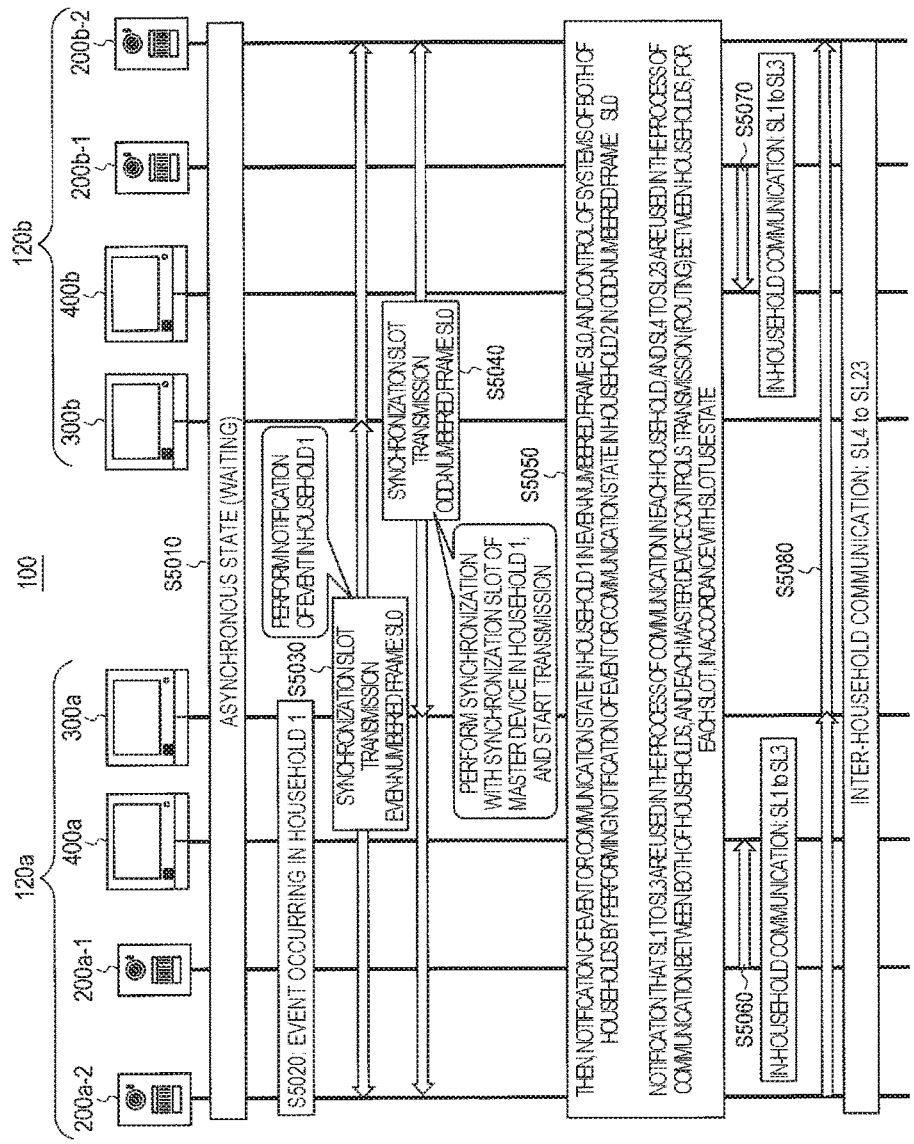
FIG. 18 is a sequence diagram illustrating an example of an operation of an intercom system according to Exemplary Embodiment 2.

FIG. 18 is a sequence diagram illustrating an example of an operation of intercom system 100 according to this exemplary embodiment. FIG. 18 corresponds to FIGS. 12 to 14 in Exemplary Embodiment 1.

In the asynchronous state (event waiting state) (S5010), it is assumed that an event such as an operation of the call button in entrance slave device 200a occurs in Household 1 (S5020). If the event occurs, first intercom master device 300a starts transmission of the synchronization slot (SL0) in an even-numbered frame, and notifies each of the terminals including second intercom master device 300b that the event occurs (S5030). Second intercom master device 300b which has received the synchronization slot is synchronized with the synchronization slot of first intercom master device 300a (master device in Household 1), and starts transmission of the synchronization slot (SL0) in an odd-numbered frame (S5040).

Then, first intercom master device 300a performs a notification of an event or a communication state in Household 1 (first communication network 120a) by using the synchronization slot (SL0) of an even-numbered frame. Second intercom master device 300b performs a notification of an event or a communication state in Household 2 (second communication network 120b) by using the synchronization slot (SL0) of an odd-numbered frame. That is, first intercom master device 300a and second intercom master device 300b control the systems of both of the households (S5050).

For example, as illustrated in FIG. 17, first intercom master device 300a and second intercom master device 300b perform a notification that the first to the third slots (SL1 to SL3) are used in communication in a household, and the fourth to the 23rd slots (SL4 to SL23) are used in communication between both of the households. Each intercom master device 300 controls transmission (routing) between the households, for each slot, in accordance with a slot use state. As a result, in intercom system 100, in-household communication is performed in the first to the third slots (SL1 to SL3) (S5060, S5070), and inter-household communication is performed in the fourth to the 23rd slots (SL4 to SL23) (S5080).

As described above, in intercom system 100 according to this exemplary embodiment, operation setter 334 (first operation setter) of first intercom master device 300a sets share or unshare for each slot, by using a predetermined frame (even-numbered frame). Connection controller 335 (first connection controller) of first intercom master device 300a controls connection or disconnection between communication networks 120, in accordance with at least settings of the share or the unshare by operation setter 334 of first intercom master device 300a.

Operation setter 334 (second operation setter) of second intercom master device 300b sets share or unshare for each slot, by using another frame (odd-numbered frame) which is different from the predetermined frame. Connection controller 335 (second connection controller) of second intercom master device 300b controls connection or disconnection between communication networks 120, in accordance with at least settings of the share or the unshare by operation setter 334 of second intercom master device 300b.

For example, in Exemplary Embodiment 1, as indicated by Step S3040 in FIG. 13, negotiation of whether in-household communication is performed or whole-household communication is performed between the main master device and the sub-master device is required. At this point, in intercom system 100 according to this exemplary embodiment, each master device can independently control an operation of each of the terminals in each of the households, and it is possible to reduce processing load of the main master device and to simplify the control more.

The timing when a terminal functioning as a target of slot management information is switched (between first communication network 120a and second communication network 120b) is not limited to the above-described example. For example, operation setter 334 of the main master device and operation setter 334 of the sub-master device may perform switching between a synchronization slot in which each of a plurality of terminals in first communication network 120a is set as a designated terminal, and a synchronization slot in which each of a plurality of terminals in second communication network 120b is set as a designated terminal, for each of a plurality of frames. Operation setter 334 may transmit the switched synchronization slot. The transmission interval may be different between first communication network 120a and second communication network 120b.

In a case where abnormality occurs in the main master device, the sub-master device side may detect that abnormality occurs in the main master device, and may start transmission of the synchronization frame. Thus, even in a case where a situation in which transmission of a synchronization frame by the main master device is not possible occurs in the process of communication, the slot management information can be transmitted in an even-numbered frame. That is, even in a case where a control of an operation of intercom system 100 by first intercom master device 300a is not possible due to, for example, power OFF, second intercom master device 300b can control an operation of intercom system 100, and it is possible to reduce a probability of stopping the operations of both of communication networks 120.

Exemplary Embodiment 3

Configurations of an intercom system and each device according to Exemplary Embodiment 3 are similar to those in Exemplary Embodiment 2. Thus, illustrations and descriptions thereof will be omitted. However, an operation of each intercom master device 300 according to this exemplary embodiment is different from that in Exemplary Embodiment 2. Specifically, among first intercom master device 300a and second intercom master device 300b, the device in which a predetermined event occurs ahead in the household transmits a synchronization slot ahead. In this exemplary embodiment, intercom master device 300 which transmits the synchronization slot ahead is referred to as "the main master device", and intercom master device 300 which is not the main master device is referred to as "the sub-master device".

Figure 19:
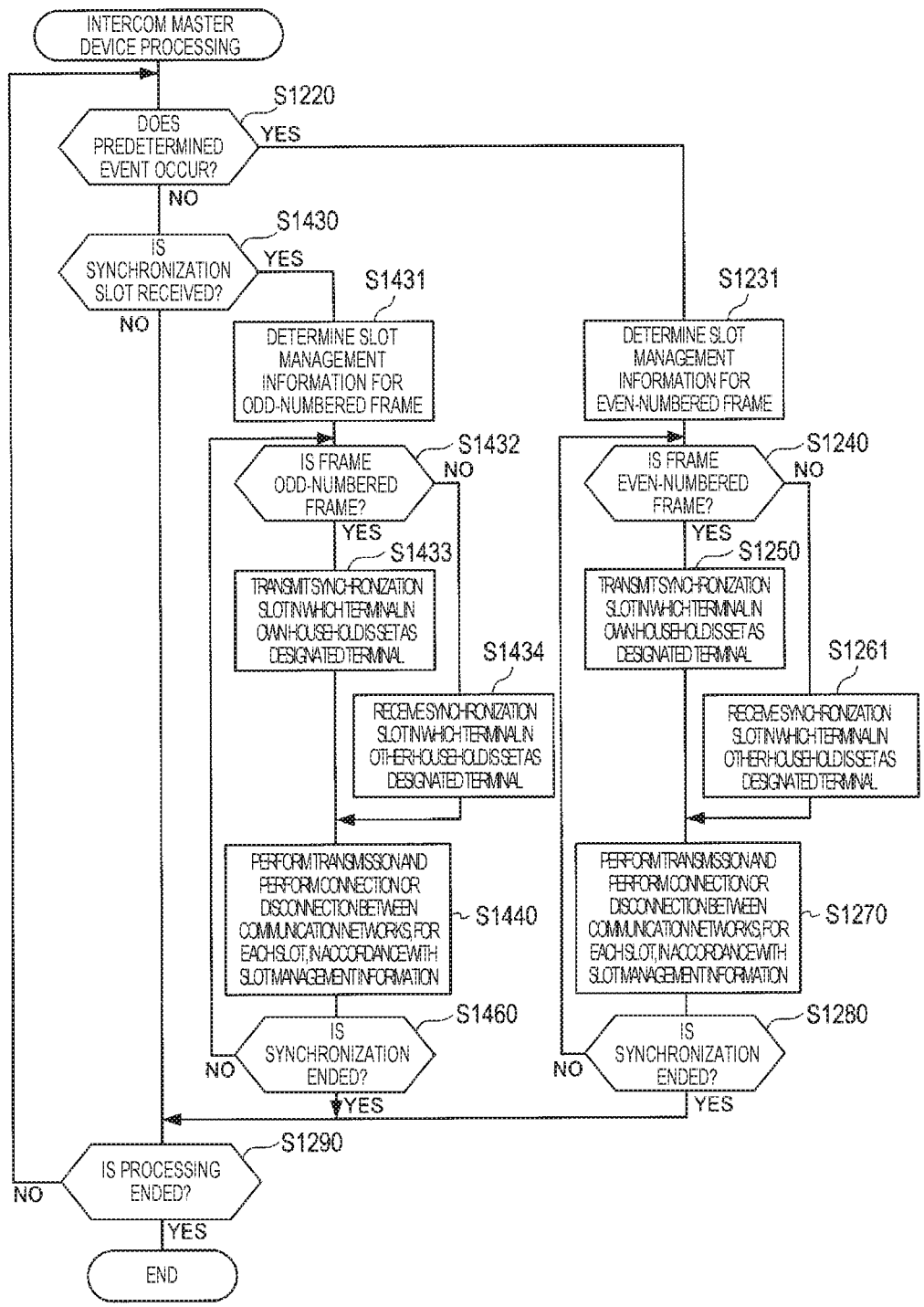
FIG. 19 is a flowchart illustrating an example of an operation of an intercom master device according to Exemplary Embodiment 3.

FIG. 19 is a flowchart illustrating an example of an operation of intercom master device 300. FIG. 19 corresponds to FIGS. 8 to 10 in Exemplary Embodiment 1 and FIGS. 15 and 16 in Exemplary Embodiment 2. Components which are the same as those in FIGS. 8 to 10, 15, and 16 are denoted by the same step numbers, and descriptions thereof will be omitted.

In a case where a predetermined event occurs in the household before the synchronization slot is received from the other intercom master device 300 (S1220: YES), intercom master device 300 performs the processes of Steps S1231 to S1290 (FIG. 15). That is, intercom master device 300 transmits a synchronization slot (slot management information) for the own household, in each even-numbered frame of which the frame number is started from "0".

In a case where the synchronization slot is received from the other intercom master device 300 before a predetermined event occurs in the household (S1220: NO, S1430: YES), intercom master device 300 performs the processes of Steps S1431 to S1460 (FIG. 16). If synchronization is ended (S1460: YES), intercom master device 300 causes the process to proceed to Step S1290. In this case, firstly, intercom master device 300 receives a synchronization slot from the other intercom master device 300 in the frame having the frame number of "0". Accordingly, intercom master device 300 transmits the synchronization slot (slot management information) for the own household in each odd-numbered frame of which the frame number is started from "1".

Figure 20:
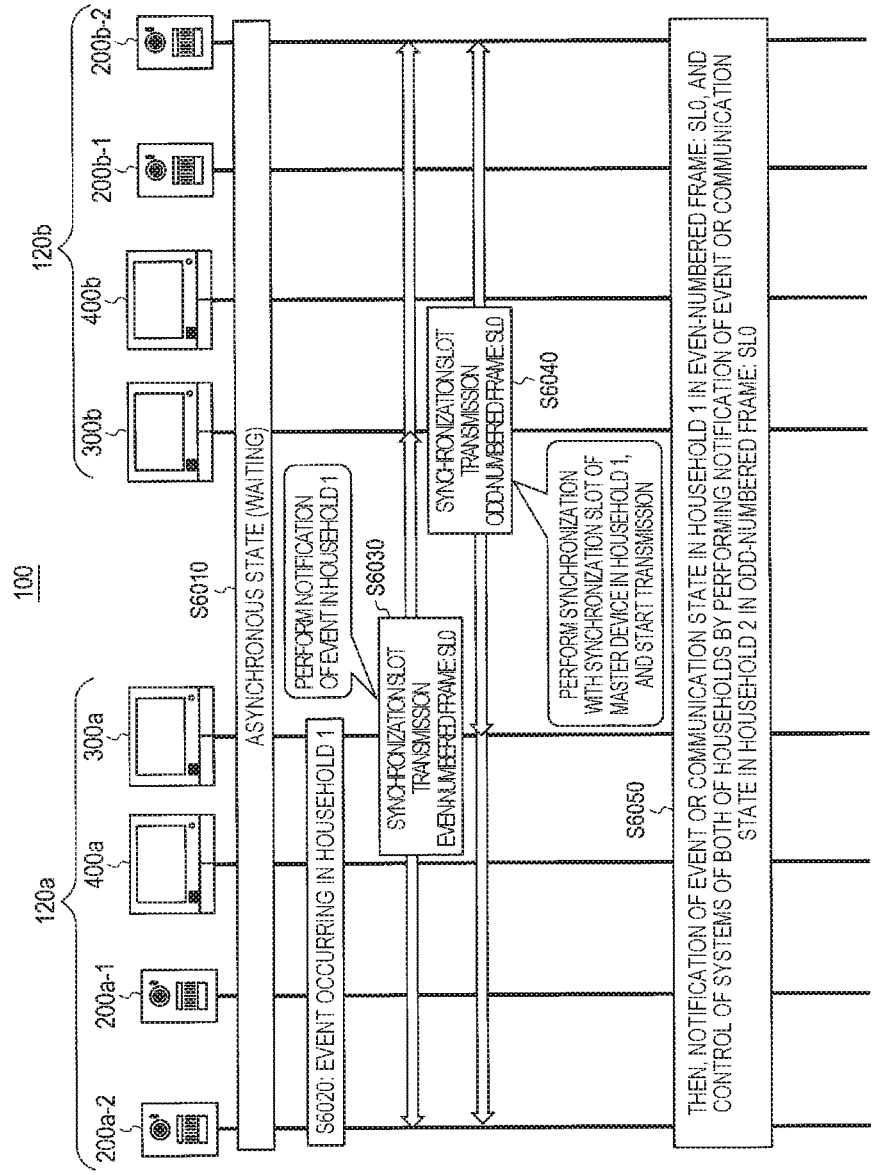
FIG. 20 is a sequence diagram illustrating an example of an operation in a case where a predetermined event occurs in advance in a first communication network of the intercom system according to Exemplary Embodiment 3.

FIG. 20 is a sequence diagram illustrating an example of an operation of intercom system 100 according to this exemplary embodiment, in a case where a predetermined event occurs ahead in first communication network 120*a*. FIG. 20 corresponds to FIG. 18 in Exemplary Embodiment 2.

In the asynchronous state (event waiting state) (S6010), it is assumed that an event such as an operation of the call button in entrance slave device 200*a* occurs in Household 1 (S6020). If the event occurs, first intercom master device 300*a* starts the synchronization slot (SL0) in an even-numbered frame, and notifies each of the terminals including second intercom master device 300*b* that the event occurs (S6030). Second intercom master device 300*b* which has received the synchronization slot is synchronized with the synchronization slot of first intercom master device 300*a* (master device in Household 1), and starts transmission of the synchronization slot (SL0) in an odd-numbered frame (S6040).

Then, first intercom master device 300*a* performs a notification of an event or a communication state in Household 1 (first communication network 120*a*) by using the synchronization slot (SL0) of an even-numbered frame. Second intercom master device 300*b* performs a notification of an event or a communication state in Household 2 (second communication network 120*b*) by using the synchronization slot (SL0) of an odd-numbered frame. That is, first intercom master device 300*a* and second intercom master device 300*b* control the systems of both of the households (S6050).

FIG. 21 is a sequence diagram illustrating an example of an operation of intercom system 100 according to this exemplary embodiment, in a case where a predetermined event occurs ahead in second communication network 120*b*. FIG. 21 corresponds to FIG. 20.

In the asynchronous state (event waiting state) (S7010), it is assumed that an event such as an operation of the call button occurs in Household 2 in entrance slave device 200*b* (S7020). If the event occurs, second intercom master device 300*b* starts transmission of the synchronization slot (SL0) in an even-numbered frame, and notifies each of the terminals including first intercom master device 300*a* that the event occurs (S7030). First intercom master device 300*a* which has received the synchronization slot is synchronized with the synchronization slot of second intercom master device 300*b* (master device in Household 2), and starts transmission of the synchronization slot (SL0) in an odd-numbered frame (S7040).

Then, second intercom master device 300*b* performs a notification of an event or a communication state in Household 2 (second communication network 120*b*) by using the synchronization slot (SL0) of an even-numbered frame. First intercom master device 300*a* performs a notification of an event or a communication state in Household 1 (first communication network 120*a*) by using the synchronization slot (SL0) of an odd-numbered frame. That is, first intercom master device 300*a* and second intercom master device 300*b* control the systems of both of the households (S7050).

For example, in the case of FIG. 20, even when second intercom master device 300*b* has a problem or a state of power OFF occurs, communication in Household 1 (first communication network 120*a*) is controlled by the synchronization slot (SL0) in which first intercom master device 300*a* performs transmission. In the case of FIG. 21, even when first intercom master device 300*a* has a problem or a state of power OFF occurs, communication in Household 2 (second communication network 120*b*) is controlled by the synchronization slot (SL0) in which second intercom master device 300*b* performs transmission.

As described above, in intercom system 100 according to this exemplary embodiment, a frame (predetermined frame) used by first intercom master device 300*a* and a frame (another frame) used by second intercom master device 300*b* are determined based on intercom master device 300 which transmits the frame ahead.

Thus, even in a case where an operation of intercom master device 300 in any communication network 120 is stopped before synchronization of the communication is established or after the synchronization of the communication is established, intercom system 100 according to this exemplary embodiment can start an operation of another communication network 120. In a case where intercom master device 300 of which an operation has been stopped is activated again, intercom master device 300 can start an operation of communication network 120 to which intercom master device 300 belongs, without performing processing such as re-synchronization. That is, in intercom system 100 according to this exemplary embodiment, it is possible to enable more robust communication, and to more improve convenience when being used in a plurality of households.

Each intercom master device 300 may determine a frame (any of an even-numbered frame and an odd-numbered frame) in which the synchronization slot is transmitted, in advance. The switching interval of the transmission subject of the synchronization slot is not limited to one frame. The switching interval may correspond to a plurality of frames, similarly to Exemplary Embodiment 1 and Exemplary Embodiment 2.

CONCLUSION OF PRESENT DISCLOSURE

The intercom system according to the present disclosure includes the first communication network in which a plurality of terminals including the first entrance slave device and the first intercom master device are set as communication subjects, and communication is performed by time division duplex, the second communication network in which a plurality of terminals including the second entrance slave device and the second intercom master device are set as communication subjects, and communication is performed by the time division duplex, the network connector for connecting the first communication network and the second communication network, the operation setter which sets share or unshare indicating whether or not information stored in a slot is shared between the first communication network and the second communication network, for each slot, and the connection controller which controls the network connector to perform connection or disconnection between the first communication network and the second communication network, in accordance with the settings of the share or the unshare.

In the intercom system, each of the first communication network and the second communication network may perform communication by using a frame in which a synchronization slot is provided at the leading. The operation setter may set the share for at least the synchronization slot.

In the intercom system, each of the first communication network and the second communication network may perform the communication by using the frame which includes a plurality of data slots for storing data. The operation setter may transmit the synchronization slot in which slot management information indicating the settings and the use authority of the share or the unshare for each slot of the frame, the designated terminal which is a terminal required to follow the use authority is stored, to each of the plurality of terminals in the first communication network and each of the plurality of terminals in the second communication network. When the terminal corresponds to the designated terminal for the first frame, the terminal may operate in the first frame, in accordance with the use authority of the first frame. When the terminal does not correspond to the designated terminal for the first frame, but corresponds to the designated terminal for the second frame which has been previously received, the terminal may operate in the first frame, in accordance with the use authority of the second frame.

In the intercom system, the frame may include a designated-terminal transmission slot which is the data slot used when the designated terminal for the frame performs transmission. The slot management information may write transmission source information, transmission destination information, and contents classification information for each data slot. The connection controller may determines settings of the share or the unshare, for each data slot, based on the transmission source information and the transmission destination information. The terminal may determine whether or not the terminal corresponds to the designated terminal for the frame, for each frame, based on the transmission source information of the designated-terminal transmission slot.

In the intercom system, the operation setter may perform switching between the synchronization slot in which each of the plurality of terminals in the first communication network is set as the designated terminal, and the synchronization slot in which each of the plurality of terminals in the second communication network is set as the designated terminal, for each one frame or each of a plurality of frames. The operation setter may transmit the switched synchronization slot.

In the intercom system, the operation setter may set the transmission source and the transmission destination of the data slot of the frame, over the first communication network and the second communication network, so as to set share for the data slot. The operation setter may set the transmission source and the transmission destination of the data slot of the frame, without crossing over the first communication network and the second communication network, so as to set unshare for the data slot. The connection controller may connect the first communication network and the second communication network in the data slot in which the share is set. The connection controller may disconnect the first communication network and the second communication network in the data slot in which the unshare is set.

In the intercom system, the operation setter and the connection controller may be disposed in at least the first intercom master device.

The communication control method according to the present disclosure includes a step of setting share or unshare indicating whether or not information stored in a slot is shared, for each slot, between the first communication network in which a plurality of terminals including the first entrance slave device and the first intercom master device are set as communication subject and communication is performed by time division duplex, and the second communication network in which a plurality of terminals including the second entrance slave device and the second intercom master device are set as the communication subjects, and communication is performed by the time division duplex, and a step of controlling connection or disconnection between the first communication network and the second communication network, in accordance with the settings of the share or the unshare.

The intercom system and the communication control method according to the present disclosure are useful as an intercom system and a communication control method in which it is possible to achieve improvement of convenience when being used in a plurality of households.

What is claimed is:
1. An intercom system comprising:
   a first communication network in which communication is performed between a plurality of terminals including a first entrance slave device and a first intercom master device over a first communication cable; and
   a second communication network in which communication is performed between a plurality of terminals including a second entrance slave device and a second intercom master device over a second communication cable different from the first communication cable,
   wherein
      the first communication network and the second communication network are connected to each other via a third communication cable different from the first communication cable and the second communication cable,
      each of the first communication network and the second communication network performs the communication by using a frame,
      the frame is configured by a time slot group which includes a plurality of data slots and a synchronization slot, and
      at least one of the first intercom master device and the second intercom master device, in operation, setting share or unshare of information of each data slot for the synchronization slot between the first communication network and the second communication network and controlling connection or disconnection for each data slot between the first communication network and the second communication network, in accordance with settings of the share or the unshare of information.

2. The intercom system of claim 1, wherein
setting share or unshare of information includes indicating whether or not information stored in a time slot is shared between the first communication network and the second communication network,
at least one of the first intercom master device and the second intercom master device, in operation, sets the share for at least the synchronization slot.

3. The intercom system of claim 2, wherein
at least one of the first intercom master device and the second intercom master device, in operation, transmits the synchronization slot in which slot management information is stored, to each of the plurality of terminals in the first communication network and each of the plurality of terminals in the second communication network,
the slot management information indicates settings and an use authority of the share or the unshare for each time slot, and a designated terminal which is a terminal to be based on the use authority, and
the terminal, in operation, operates in a first frame, in accordance with the use authority of the first frame when the terminal corresponds to a designated terminal for the first frame, and the terminal operates in the first frame, in accordance with the use authority of a second frame when the terminal does not correspond to the designated terminal for the first frame, but corresponds to a designated terminal for the second frame which has been previously received.

4. The intercom system of claim 3, wherein
the frame includes a designated-terminal transmission slot which is a data slot of the frame, which is used when the designated terminal for the frame performs transmission,
in the slot management information, transmission source information, transmission destination information, and contents classification information are written for each data slot,
at least one of the first intercom master device and the second intercom master device, in operation, determines settings of the share or the unshare, based on the transmission source information and the transmission destination information for each data slot, and
the terminal, in operation, determines whether or not the terminal corresponds to the designated terminal for the frame, for each frame, based on the transmission source information of the designated-terminal transmission slot.

5. The intercom system of claim 4, wherein at least one of the first intercom master device and the second intercom master device, in operation, and performs switching between a synchronization slot in which each of the plurality of terminals of the first communication network is set as the designated terminal, and a synchronization slot in which each of the plurality of terminals of the second communication network is set as the designated terminal, for each one frame or each of a plurality of frames, and performs transmission.

6. The intercom system of claim 5, wherein
at least one of the first intercom master device and the second intercom master device, in operation, sets a transmission source and a transmission destination of the data slot of the frame, over the first communication network and the second communication network, so as to set share for the data slot, and sets the transmission source and the transmission destination of the data slot of the frame without crossing over the first communication network and the second communication network, so as to set unshare for the data slot, and
the first communication network and the second communication network are connected to each other in the data slot in which the share is set, and the first communication network and the second communication network are disconnected to each other in the data slot in which the unshare is set.

7. A communication control method in an intercom system in which a first communication network in which communication is performed between a plurality of terminals including a first entrance slave device and a first intercom master device over a first communication cable, and a second communication network in which communication is performed between a plurality of terminals including a second entrance slave device and a second intercom master device are provided over a second communication cable different from the first communication cable, and the first communication network and the second communication network are connected to each other via a third communication cable different from the first communication cable and the second communication cable, the method comprising:
causing each of the first communication network and the second communication network to perform the communication by using a frame, the frame configured by a time slot group which includes a plurality of data slots and a synchronization slot; and
causing at least one of the first intercom master device and the second intercom master device to set share or unshare of information of each data slot for the synchronization slot between the first communication network and the second communication network and to control connection or disconnection for each data slot between the first communication network and the second communication network, in accordance with settings of the share or the unshare of information.

* * * * *